(12) United States Patent  
Dannoux et al.

(10) Patent No.: US 12,271,040 B2  
(45) Date of Patent: Apr. 8, 2025

(54) FIBER OPTIC EXTENDER PORTS, ASSEMBLIES AND METHODS OF MAKING THE SAME

(71) Applicant: Corning Research & Development Corporation, Corning, NY (US)

(72) Inventors: Thierry Luc Alain Dannoux, Avon (FR); Felix Scotta, Avon (FR); Michael Wimmer, Berlin (DE); Shane C. Woody, Mooresville, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/658,539

(22) Filed: Oct. 21, 2019

(65) Prior Publication Data

US 2020/0049896 A1    Feb. 13, 2020

Related U.S. Application Data

(63) Continuation of application No. PCT/US2018/040011, filed on Jun. 28, 2018, which
(Continued)

(51) Int. Cl.  
   *G02B 6/38*     (2006.01)
(52) U.S. Cl.  
   CPC .......... *G02B 6/387* (2013.01); *G02B 6/3825* (2013.01); *G02B 6/3851* (2013.01); *G02B 6/3893* (2013.01)

(58) Field of Classification Search  
CPC ..... G02B 6/3825; G02B 6/3831; G02B 6/383  
See application file for complete search history.

(56) References Cited

U.S. PATENT DOCUMENTS

| 3,074,107 A | 1/1963 | Kiyoshi et al. |
| 3,532,783 A | 10/1970 | Pusey et al. |
| (Continued) | | |

FOREIGN PATENT DOCUMENTS

| AU | 2006232206 A1 | 10/2006 |
| CN | 1060911 A | 5/1992 |
| (Continued) | | |

OTHER PUBLICATIONS

CoolShirt fittings, https://www.amazon.com/Cool-Shirt-5014-0001-Release-Connectors/dp/B01LXBXYJ9, Sep. 23, 2016 (Year: 2016).*

(Continued)

*Primary Examiner* — Eric Wong  
(74) *Attorney, Agent, or Firm* — Michael E. Carroll, Jr.

(57) ABSTRACT

Extender ports comprising one or more connection ports with associated securing features and methods for making the same are disclosed. In one embodiment, the device comprises a shell, a first and second connection port, at least one securing feature passageway, and at least one securing feature. The first and second connection ports are disposed on the extender port and aligned for making an optical connection between external fiber optic connectors inserted into respective connection ports. The securing features are associated with the connection port passageway, and are suitable for retaining and releasing the external fiber optic connectors.

35 Claims, 20 Drawing Sheets

Related U.S. Application Data is a continuation-in-part of application No. 16/018,988, filed on Jun. 26, 2018, now Pat. No. 10,359,577, and a continuation-in-part of application No. PCT/US2018/039494, filed on Jun. 26, 2018, and a continuation-in-part of application No. 16/019,008, filed on Jun. 26, 2018, now Pat. No. 10,429,594, and a continuation-in-part of application No. PCT/US2018/039485, filed on Jun. 26, 2018, and a continuation-in-part of application No. 16/018,918, filed on Jun. 26, 2018, now Pat. No. 10,379,298, and a continuation-in-part of application No. PCT/US2018/039484, filed on Jun. 26, 2018, and a continuation-in-part of application No. PCT/US2017/064092, filed on Nov. 30, 2017, which is a continuation-in-part of application No. PCT/US2017/064095, filed on Nov. 30, 2017.

(60) Provisional application No. 62/526,195, filed on Jun. 28, 2017.

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,044,215 A * | 8/1977 | Leibinger ............ H01H 9/28 200/321 |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,794,828 A * | 1/1989 | Olson ............ B25B 23/0035 81/177.85 |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A * | 7/1998 | Castle ............ A61N 1/3752 607/37 |
| 5,789,701 A | 8/1998 | Wettengel et al. |
| 5,790,740 A | 8/1998 | Cloud et al. |
| 5,791,918 A * | 8/1998 | Pierce ............ H01T 13/04 439/814 |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,857,481 A * | 1/1999 | Zimmerman ........ B60S 5/043 137/227 |
| 5,862,290 A | 1/1999 | Burek et al. |
| 5,867,621 A | 2/1999 | Luther et al. |
| 5,876,071 A * | 3/1999 | Aldridge ............ F16L 37/0885 285/321 |
| 5,883,999 A | 3/1999 | Cloud et al. |

(56) References Cited

U.S. PATENT DOCUMENTS

| | | | |
|---|---|---|---|
| 5,884,000 A | 3/1999 | Cloud et al. | |
| 5,884,001 A | 3/1999 | Cloud et al. | |
| 5,884,002 A | 3/1999 | Cloud et al. | |
| 5,884,003 A | 3/1999 | Cloud et al. | |
| 5,887,099 A | 3/1999 | Csipkes et al. | |
| 5,913,001 A | 6/1999 | Nakajima et al. | |
| 5,920,669 A | 7/1999 | Knecht et al. | |
| 5,923,804 A | 7/1999 | Rosson | |
| 5,925,191 A | 7/1999 | Stein et al. | |
| 5,926,596 A | 7/1999 | Edwards et al. | |
| 5,960,141 A | 9/1999 | Sasaki et al. | |
| 5,961,344 A * | 10/1999 | Rosales | H01R 12/774 |
| | | | 439/495 |
| 5,971,626 A | 10/1999 | Knodell et al. | |
| 5,993,070 A | 11/1999 | Tamekuni et al. | |
| RE36,592 E | 2/2000 | Giebel et al. | |
| 6,030,129 A | 2/2000 | Rosson | |
| 6,035,084 A | 3/2000 | Haake et al. | |
| 6,045,270 A | 4/2000 | Weiss et al. | |
| 6,079,881 A | 6/2000 | Roth | |
| 6,094,517 A | 7/2000 | Yuuki | |
| 6,108,482 A | 8/2000 | Roth | |
| 6,112,006 A | 8/2000 | Foss | |
| 6,149,313 A | 11/2000 | Giebel et al. | |
| 6,151,432 A | 11/2000 | Nakajima et al. | |
| RE37,028 E | 1/2001 | Cooke et al. | |
| 6,173,097 B1 | 1/2001 | Throckmorton et al. | |
| 6,179,482 B1 | 1/2001 | Takizawa et al. | |
| 6,188,822 B1 | 2/2001 | Mcalpine et al. | |
| 6,193,421 B1 | 2/2001 | Tamekuni et al. | |
| RE37,079 E | 3/2001 | Stephenson et al. | |
| RE37,080 E | 3/2001 | Stephenson et al. | |
| 6,200,040 B1 | 3/2001 | Edwards et al. | |
| 6,206,579 B1 | 3/2001 | Selfridge et al. | |
| 6,206,581 B1 | 3/2001 | Driscoll et al. | |
| 6,224,268 B1 | 5/2001 | Manning et al. | |
| 6,224,270 B1 | 5/2001 | Nakajima et al. | |
| 6,229,944 B1 | 5/2001 | Yokokawa et al. | |
| 6,234,683 B1 | 5/2001 | Waldron et al. | |
| 6,234,685 B1 | 5/2001 | Carlisle et al. | |
| 6,249,628 B1 | 6/2001 | Rutterman et al. | |
| 6,256,438 B1 | 7/2001 | Gimblet | |
| 6,261,006 B1 | 7/2001 | Selfridge | |
| 6,264,374 B1 | 7/2001 | Selfridge et al. | |
| 6,287,016 B1 | 9/2001 | Weigel | |
| 6,293,710 B1 | 9/2001 | Lampert et al. | |
| 6,298,190 B2 | 10/2001 | Waldron et al. | |
| 6,305,849 B1 | 10/2001 | Roehrs et al. | |
| 6,321,013 B1 | 11/2001 | Hardwick et al. | |
| 6,356,390 B1 | 3/2002 | Hall, Jr. | |
| 6,356,690 B1 | 3/2002 | McAlpine et al. | |
| 6,357,929 B1 | 3/2002 | Roehrs et al. | |
| 6,371,660 B1 | 4/2002 | Roehrs et al. | |
| 6,375,363 B1 | 4/2002 | Harrison et al. | |
| 6,379,054 B2 | 4/2002 | Throckmorton et al. | |
| 6,386,891 B1 | 5/2002 | Howard et al. | |
| 6,402,388 B1 | 6/2002 | Imazu et al. | |
| 6,404,962 B1 | 6/2002 | Hardwick et al. | |
| 6,409,391 B1 | 6/2002 | Chang | |
| 6,422,764 B1 | 7/2002 | Marrs et al. | |
| 6,427,035 B1 | 7/2002 | Mahony | |
| 6,428,215 B1 | 8/2002 | Nault | |
| 6,439,780 B1 | 8/2002 | Mudd et al. | |
| 6,466,725 B2 | 10/2002 | Battey et al. | |
| 6,496,641 B1 | 12/2002 | Mahony | |
| 6,501,888 B2 | 12/2002 | Gimblet et al. | |
| 6,522,804 B1 | 2/2003 | Mahony | |
| 6,529,663 B1 | 3/2003 | Parris et al. | |
| 6,533,468 B2 | 3/2003 | Nakajima et al. | |
| 6,536,956 B2 | 3/2003 | Luther et al. | |
| 6,539,147 B1 | 3/2003 | Mahony | |
| 6,540,410 B2 | 4/2003 | Childers et al. | |
| 6,542,652 B1 | 4/2003 | Mahony | |
| 6,542,674 B1 | 4/2003 | Gimblet | |
| 6,546,175 B1 | 4/2003 | Wagman et al. | |
| 6,554,489 B2 | 4/2003 | Kent et al. | |
| 6,579,014 B2 | 6/2003 | Melton et al. | |
| 6,599,026 B1 | 7/2003 | Fahrnbauer et al. | |
| 6,599,027 B2 | 7/2003 | Miyake et al. | |
| 6,614,980 B1 | 9/2003 | Mahony | |
| 6,618,526 B2 | 9/2003 | Jackman et al. | |
| 6,619,697 B2 | 9/2003 | Griffioen et al. | |
| 6,621,964 B2 | 9/2003 | Quinn et al. | |
| 6,625,375 B1 | 9/2003 | Mahony | |
| 6,629,782 B2 | 10/2003 | McPhee et al. | |
| 6,644,862 B1 | 11/2003 | Berto et al. | |
| 6,648,520 B2 | 11/2003 | McDonald et al. | |
| 6,668,127 B1 | 12/2003 | Mahony | |
| 6,672,774 B2 | 1/2004 | Theuerkorn et al. | |
| 6,678,442 B2 | 1/2004 | Gall et al. | |
| 6,678,448 B2 | 1/2004 | Moisel et al. | |
| 6,685,361 B1 | 2/2004 | Rubino et al. | |
| 6,695,489 B2 | 2/2004 | Nault | |
| 6,702,475 B1 * | 3/2004 | Giobbio | G02B 6/3825 |
| | | | 385/53 |
| 6,714,708 B2 | 3/2004 | Mcalpine et al. | |
| 6,714,710 B2 | 3/2004 | Gimblet | |
| 6,729,773 B1 | 5/2004 | Finona et al. | |
| 6,738,555 B1 | 5/2004 | Cooke et al. | |
| 6,748,146 B2 | 6/2004 | Parris | |
| 6,748,147 B2 | 6/2004 | Quinn et al. | |
| 6,771,861 B2 | 8/2004 | Wagner et al. | |
| 6,785,450 B2 | 8/2004 | Wagman et al. | |
| 6,789,950 B1 | 9/2004 | Loder et al. | |
| 6,809,265 B1 | 10/2004 | Gladd et al. | |
| 6,841,729 B2 | 1/2005 | Sakabe et al. | |
| 6,848,838 B2 | 2/2005 | Doss et al. | |
| 6,856,748 B1 | 2/2005 | Elkins et al. | |
| 6,877,906 B2 | 4/2005 | Mizukami et al. | |
| 6,880,219 B2 | 4/2005 | Griffioen et al. | |
| 6,899,467 B2 | 5/2005 | McDonald et al. | |
| 6,908,233 B2 | 6/2005 | Nakajima et al. | |
| 6,909,821 B2 | 6/2005 | Ravasio et al. | |
| 6,916,120 B2 | 7/2005 | Zimmel et al. | |
| 6,918,704 B2 | 7/2005 | Marrs et al. | |
| 6,944,387 B2 | 9/2005 | Howell et al. | |
| 6,962,445 B2 | 11/2005 | Zimmel et al. | |
| 6,970,629 B2 | 11/2005 | Lail et al. | |
| 6,983,095 B2 | 1/2006 | Reagan et al. | |
| 7,011,454 B2 | 3/2006 | Caveney et al. | |
| 7,013,074 B2 | 3/2006 | Battey et al. | |
| 7,025,507 B2 | 4/2006 | de Marchi | |
| 7,033,191 B1 | 4/2006 | Cao | |
| 7,044,650 B2 | 5/2006 | Tran et al. | |
| 7,052,185 B2 | 5/2006 | Rubino et al. | |
| 7,079,734 B2 | 7/2006 | Seddon et al. | |
| 7,085,468 B2 | 8/2006 | Forrester | |
| 7,088,899 B2 | 8/2006 | Reagan et al. | |
| 7,090,406 B2 | 8/2006 | Melton et al. | |
| 7,090,407 B2 | 8/2006 | Melton et al. | |
| 7,090,409 B2 | 8/2006 | Nakajima et al. | |
| 7,103,255 B2 | 9/2006 | Reagan et al. | |
| 7,103,257 B2 | 9/2006 | Donaldson et al. | |
| 7,104,702 B2 | 9/2006 | Barnes et al. | |
| 7,111,990 B2 | 9/2006 | Melton et al. | |
| 7,113,679 B2 | 9/2006 | Melton et al. | |
| 7,118,283 B2 | 10/2006 | Nakajima et al. | |
| 7,118,284 B2 | 10/2006 | Nakajima et al. | |
| 7,120,347 B2 | 10/2006 | Blackwell, Jr. et al. | |
| 7,137,742 B2 | 11/2006 | Theuerkorn et al. | |
| 7,146,089 B2 | 12/2006 | Reagan et al. | |
| 7,146,090 B2 | 12/2006 | Vo et al. | |
| 7,150,567 B1 | 12/2006 | Luther et al. | |
| 7,165,893 B2 | 1/2007 | Schmitz | |
| 7,171,102 B2 | 1/2007 | Reagan et al. | |
| 7,178,990 B2 | 2/2007 | Caveney et al. | |
| 7,184,634 B2 | 2/2007 | Hurley et al. | |
| 7,195,403 B2 | 3/2007 | Oki et al. | |
| 7,200,317 B2 | 4/2007 | Reagan et al. | |
| 7,201,518 B2 | 4/2007 | Holmquist | |
| 7,204,644 B2 | 4/2007 | Barnes et al. | |
| 7,213,975 B2 | 5/2007 | Khemakhem et al. | |
| 7,213,980 B2 | 5/2007 | Oki et al. | |
| 7,228,047 B1 | 6/2007 | Szilagyi et al. | |

(56) References Cited

U.S. PATENT DOCUMENTS

| | | | |
|---|---|---|---|
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell, Jr. et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,580,607 B2 | 8/2009 | Jones et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell, Jr. et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |

(56) References Cited

U.S. PATENT DOCUMENTS

| | | |
|---|---|---|
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,770,862 B2 | 7/2014 | Lu et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,944,703 B2 | 2/2015 | Song et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | Mcgranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,684,138 B2 | 1/2017 | Lu |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,379,308 B2 | 8/2019 | Coate |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |

(56) References Cited

U.S. PATENT DOCUMENTS

| | | |
|---|---|---|
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |

(56) References Cited

U.S. PATENT DOCUMENTS

| | | |
|---|---|---|
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1* | 6/2009 | Radle ............... H01R 4/5008 439/291 |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De Montmorillon et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins, II et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle, Jr. et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0013813 A1* | 1/2014 | Le ............... E05B 17/002 292/145 |
| 2014/0016902 A1* | 1/2014 | Pepe ............... H01R 24/64 385/76 |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |

(56) References Cited

U.S. PATENT DOCUMENTS

| | | |
|---|---|---|
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette, Jr. et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van Baelen et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1* | 6/2017 | Hayauchi .............. G02B 6/3821 |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1* | 8/2017 | Young ................ A61B 5/02154 |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van et al. |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267265 A1 | 9/2018 | Zhang et al. |
| 2018/0329149 A1 | 11/2018 | Mullaney et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |

(56) References Cited

U.S. PATENT DOCUMENTS

| | | | |
|---|---|---|---|
| 2020/0116958 A1 | 4/2020 | Dannoux et al. |
| 2020/0116962 A1 | 4/2020 | Dannoux et al. |
| 2020/0124812 A1 | 4/2020 | Dannoux et al. |
| 2020/0132939 A1 | 4/2020 | Coenegracht et al. |
| 2020/0174214 A1 | 6/2020 | Alves et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |

FOREIGN PATENT DOCUMENTS

| | | | |
|---|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 105467529 A | 4/2016 |
| CN | 105492946 A | 4/2016 |
| CN | 106716205 A | 5/2017 |
| CN | 106873086 A | 6/2017 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 957381 A1 | 11/1999 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1786079 A1 * | 5/2007 | ............ H01R 13/52 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3207223 A1 | 8/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63089421 A | 4/1988 |
| JP | 63078908 U | 5/1988 |
| JP | 03-063615 A | 3/1991 |
| JP | 03207223 A | 9/1991 |
| JP | 05-106765 A | 4/1993 |
| JP | 05-142439 A | 6/1993 |
| JP | 05-297246 A | 11/1993 |
| JP | 06-320111 A | 11/1994 |
| JP | 07318758 A | 12/1995 |
| JP | 08-050211 A | 2/1996 |
| JP | 08-054522 A | 2/1996 |
| JP | 08-062432 A | 3/1996 |
| JP | 08292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001290051 A * | 10/2001 |

(56) References Cited

FOREIGN PATENT DOCUMENTS

| | | |
|---|---|---|
| JP | 2002-520987 A | 7/2002 |
| JP | 3296698 B2 | 7/2002 |
| JP | 2002-250987 A | 9/2002 |
| JP | 2003-009331 A | 1/2003 |
| JP | 2003-070143 A | 3/2003 |
| JP | 2003121699 A | 4/2003 |
| JP | 2003177279 A | 6/2003 |
| JP | 2003-302561 A | 10/2003 |
| JP | 2004-361521 A | 12/2004 |
| JP | 2005-024789 A | 1/2005 |
| JP | 2005031544 A | 2/2005 |
| JP | 2005077591 A | 3/2005 |
| JP | 2005-114860 A | 4/2005 |
| JP | 2005-520987 A | 7/2005 |
| JP | 2006023502 A | 1/2006 |
| JP | 2006-146084 A | 6/2006 |
| JP | 2006-259631 A | 9/2006 |
| JP | 2006337637 A | 12/2006 |
| JP | 2007078740 A | 3/2007 |
| JP | 2007121859 A | 5/2007 |
| JP | 2008-191422 A | 8/2008 |
| JP | 2008-250360 A | 10/2008 |
| JP | 2009265208 A | 11/2009 |
| JP | 2010152084 A | 7/2010 |
| JP | 2010-191420 A | 9/2010 |
| JP | 2011-018003 A | 1/2011 |
| JP | 2011033698 A | 2/2011 |
| JP | 2013-041089 A | 2/2013 |
| JP | 2013156580 A | 8/2013 |
| JP | 2014-095834 A | 5/2014 |
| JP | 2014085474 A | 5/2014 |
| JP | 05537852 B2 | 7/2014 |
| JP | 05538328 B2 | 7/2014 |
| JP | 2014134746 A | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 1020130081087 A | 7/2013 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006113726 A1 | 10/2006 |
| WO | 2006/123777 A1 | 11/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012037727 A1 | 3/2012 |
| WO | 2012/044741 A1 | 4/2012 |
| WO | 2012163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013/177016 A1 | 11/2013 |
| WO | 2014151259 A1 | 9/2014 |
| WO | 2014167447 A1 | 10/2014 |
| WO | 2014/179411 A1 | 11/2014 |
| WO | 2014197894 A1 | 12/2014 |
| WO | 2015/047508 A1 | 4/2015 |
| WO | 2015144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016095213 A1 | 6/2016 |
| WO | 2016100078 A1 | 6/2016 |
| WO | 2016/115288 A1 | 7/2016 |
| WO | 2016156610 A1 | 10/2016 |
| WO | 2016168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/006176 A1 | 1/2019 |
| WO | 2019005190 A2 | 1/2019 |
| WO | 2019005191 A1 | 1/2019 |
| WO | 2019005192 A1 | 1/2019 |
| WO | 2019005193 A1 | 1/2019 |
| WO | 2019005194 A1 | 1/2019 |
| WO | 2019005195 A1 | 1/2019 |
| WO | 2019005196 A1 | 1/2019 |
| WO | 2019005197 A1 | 1/2019 |
| WO | 2019005198 A1 | 1/2019 |
| WO | 2019005199 A1 | 1/2019 |
| WO | 2019005200 A1 | 1/2019 |
| WO | 2019005201 A1 | 1/2019 |
| WO | 2019005202 A1 | 1/2019 |
| WO | 2019005203 A1 | 1/2019 |
| WO | 2019005204 A1 | 1/2019 |
| WO | WO-2019006191 A1 * 1/2019 ............... G02B 6/38 | |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS https://www.amazon.com/Cool-Shirt-5014-0001-Release-Connectors/dp/B01LXBXYJ9 (Year: 2016).*

Invitation to Pay Additional Fees of the European International Searching Authority; PCT/US2019/058316; Mailed Feb. 14, 2020; 12 Pgs.

Brown, "What is Transmission Welding?" Laser Plasti Welding website, 6 pgs, Retrieved on Dec. 17, 2018 from: http://www.laserplasticwelding.com/what-is-transmission-welding.

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

Corning Cable Systems, "SST Figure-8 Drop Cables 1-12 Fibers", Preliminary Product Specifications, 11 pgs. (2002).

Corning Cable Systems, "SST-Drop (armor) Cables 1-12 Fibers", Product Specifications, 2 pgs. (2002).

Corning Cable Systems, "SST-Drop (Dielectric) Cables 1-12 Fibers", Product Specifications, 2 pgs. (2002).

Fiber Systems International: Fiber Optic Solutions, data, "TFOCA-II 4-Channel Fiber Optic Connector" sheet. 2 pgs.

Infolite—Design and Data Specifications, 1 pg. Retrieved Feb. 21, 2019.

Nawata, "Multimode and Single-Mode Fiber Connectors Technology"; IEEE Journal of Quantum Electronics, vol. QE-16, No. 6 Published Jun. 1980.

Schneier, Bruce; "Applied Cryptography: Protocols, Algorithms, and Source Code in C," Book. 1995 SEC. 10.3, 12.2, 165 Pgs.

(56) References Cited

OTHER PUBLICATIONS

Stratos: Ughtwave., "Innovation Brought to Light", Hybrid HMA Series, Hybrid Multi Application, 2 pgs.
Faulkner et al. "Optical networks for local lopp applications," J. Lightwave Technol.0733-8724 7(11), 17411751 (1989).
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Wang et al. "Opto-VLSI-based dynamic optical splitter," Electron. Lett.0013-5194 10.1049/el:20046715 40(22), 14451446 (2004).
Xiao et al. "1xN wavelength selective adaptive optical power splitter for wavelength-division-multiplexed passive optical networks," Optics & Laser Technology 68, pp. 160-164, May 2015.
Coaxum, L., et al., U.S. Appl. No. 62/341,947, "Fiber Optic Multiport Having Different Types of Ports for Multi-Use," filed May 26, 2016.
International Search Report and Written Opinion PCT/US2017/063938 Dated May 14, 2018.
International Search Report and Written Opinion PCT/US2017/063953 Dated May 14, 2018.
International Search Report and Written Opinion PCT/US2017/063991 Dated May 14, 2018.
International Search Report and Written Opinion PCT/US2017/064027 Dated Oct. 9, 2018.
International Search Report and Written Opinion PCT/US2017/064063 Dated May 15, 2018.
International Search Report and Written Opinion PCT/US2017/064071 Dated May 14, 2018.
International Search Report and Written Opinion PCT/US2017/064072 Dated May 14, 2018.
International Search Report and Written Opinion PCT/US2017/064077 Dated Feb. 26, 2018.
International Search Report and Written Opinion PCT/US2017/064084 Dated Feb. 26, 2018.
International Search Report and Written Opinion PCT/US2017/064087 Dated Feb. 26, 2018.
International Search Report and Written Opinion PCT/US2017/064092 Dated Feb. 23, 2018.
International Search Report and Written Opinion PCT/US2017/064093 Dated Feb. 26, 2018.
International Search Report and Written Opinion PCT/US2017/064095 Dated Feb. 23, 2018.
International Search Report and Written Opinion PCT/US2017/064096 Dated Feb. 26, 2018.
International Search Report and Written Opinion PCT/US2018/039019 Dated Sep. 18, 2018.
International Search Report and Written Opinion PCT/US2018/039490 Dated Oct. 4, 2018.
International Search Report and Written Opinion PCT/US2018/039494 Dated Oct. 11, 2018.
International Search Report and Written Opinion PCT/US2018/040011 Dated Oct. 5, 2018.
International Search Report and Written Opinion PCT/US2018/040104 Dated Oct. 9, 2018.
International Search Report and Written Opinion PCT/US2018/040126 Dated Oct. 9, 2018.
International Search Report and Written Opinion PCT/US2018/040130 Dated Sep. 18, 2018.
Notice of Allowance Received for U.S. Appl. No. 16/018,997 Dated Oct. 4, 2018.
Office Action Pertaining to U.S. Appl. No. 16/018,918 Dated Sep. 28, 2018.
Office Action Pertaining to U.S. Appl. No. 16/018,988 Dated Oct. 31, 2018.
Office Action Pertaining to U.S. Appl. No. 16/109,008 Dated Oct. 31, 2018.
Chinese Patent Application No. 201880056460.2, Office Action dated May 19, 2021, 12 pages (English Translation Only), Chinese Patent Office.
Liu et al., "Variable optical power splitters create new apps", Retrieved from: https://www.lightwaveonline.com/fttx/pon-systems/article/16648432/variable-optical-power-splitters-create-new-apps, 2005, 14 pages.

* cited by examiner

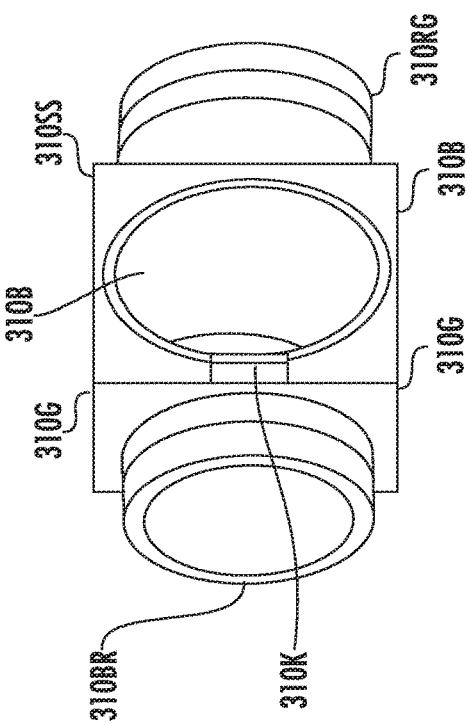
FIG. 12
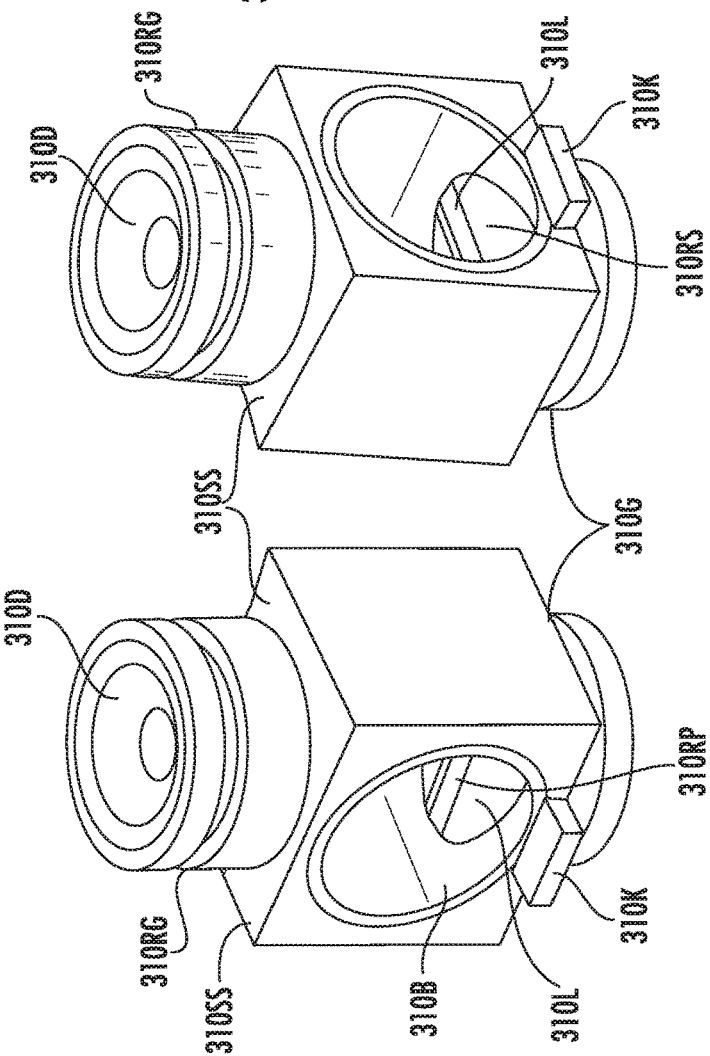
FIG. 11
FIG. 10

FIBER OPTIC EXTENDER PORTS, ASSEMBLIES AND METHODS OF MAKING THE SAME

CROSS-REFERENCE TO RELATED APPLICATIONS

This application is a continuation of International Application No. PCT/US2018/040011 filed Jun. 28, 2018, which claims the benefit of priority of U.S. Application Nos. 62/526,195, filed on Jun. 28, 2017; 16/018,918 filed on Jun. 26, 2018; 16/018,988 filed on Jun. 26, 2018; and U.S. application Ser. No. 16/019,008 filed Jun. 26, 2018; the content of which is relied upon and incorporated herein by reference in entirety.

This applications also claims the benefit of priority under 35 USC § 365 of International Patent Application Serial Nos. PCT/US2017/064092 filed on Nov. 30, 2017; PCT/US2017/064095 filed on Nov. 30, 2017; PCT/US2018/039484 filed on Jun. 26, 2018; PCT/US2018/039485 filed on Jun. 26, 2018; and PCT/US2018/039494 filed on Jun. 26, 2018; all designating the United States of America, and the content of which is relied upon and incorporated herein by reference in its entirety.

FIELD

The disclosure is directed to fiber optic devices providing at least one optical connection port along with methods for making the same. More specifically, the disclosure is directed to fiber optic extender ports comprising one or more connection ports and a securing feature associated with the connection port for securing an optical connector along with methods of making the same.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communication networks the need for making robust optical connections in outdoor applications in a quick and easy manner was apparent. To address this need for making quick, reliable, and robust optical connections in communication networks hardened fiber optic connectors such as the OptiTap® plug connector were developed.

Multiports were also developed for making an optical connection with hardened connectors. Prior art multiports have a plurality of receptacles mounted through a wall of the housing for protecting an indoor connector inside the housing that makes an optical connection to the external hardened connector of the branch or drop cable.

The different branch or drop cables may require different lengths to reach the desired connection location. With factory-terminated solutions there are typically several lengths of drop cables that are offered and the user can use the length of connectorized drop cable that best fits the link length required. However, this can require the craft to stock several different length drop cables and lots of slack storage of cable if the lengths are not well-matched to the link length required.

Consequently, there exists an unresolved need for devices that allow flexibility for the network operators to quickly and easily make optical connections to extend the reach of an optical network while also addressing concerns related to limited space, organization, or aesthetics.

SUMMARY

The disclosure is directed to extender ports comprising at leak one connection port and a securing feature associated with the connection port. Methods of making the devices are also disclosed. The devices can have any suitable construction such as disclosed herein such a connection port that is keyed for inhibiting a non-compliant connector from being inserted and potentially causing damage to the device.

One aspect of the disclosure is directed to an extender port comprising a shell, a first connection port, at least one securing feature associated with the connection port passageway, and at least one securing feature resilient member for biasing a portion of the at least one securing feature. The first connection port is disposed on the extender port with the at least one connection port comprising an optical connector opening extending from an outer surface of the extender port into a cavity of the extender port and defining a connection port passageway.

Another aspect of the disclosure is directed to an extender port comprising a shell, a first connection port, a second connection port, and at least one securing feature associated with the connection port passageway, and least one securing feature resilient member for biasing a portion of the at least one securing feature. The first connection port is disposed on the extender port with the at least one connection port comprising an optical connector opening extending from an outer surface of the extender port into a cavity of the extender port and defining a first connection port passageway. The second connection port is disposed on the extender port with the at least one connection port comprising an optical connector opening extending from an outer surface of the extender port into a cavity of the extender port and defining a second connection port passageway. The second connection port passageway being aligned with the first connection port passageway.

Yet another aspect of the disclosure is directed to an extender port comprising a shell, a first connection port, a second connection port, and at leak one securing feature associated with the connection port passageway. The first connection port is disposed on the extender port with the at least one connection port comprising an optical connector opening extending from an outer surface of the extender port into a cavity of the extender port and defining a first connection port passageway. The second connection port is disposed on the extender port with the at least one connection port comprising an optical connector opening extending from an outer surface of the extender port into a cavity of the extender port and defining a second connection port passageway. The second connection port passageway being aligned with the first connection port passageway. The at least one securing feature is capable of translating within a portion of the shell.

A further aspect of the disclosure is directed to an extender port comprising a shell, a first connection port, a second connection port, and at least one securing feature associated with the connection port passageway. The first connection port is disposed on the extender port with the at least one connection port comprising an optical connector opening extending from an outer surface of the extender port into a cavity of the extender port and defining a first connection port passageway. The second connection port is disposed on the extender port with the at least one connection port comprising an optical connector opening extending from an outer surface of the extender port into a cavity of the extender port and defining a second connection port passageway. The second connection port passageway being aligned with the first connection port passageway. The at least one securing feature comprises a common securing member, where a portion of the at least one securing feature is capable of translating within a portion of the shell.

A still further aspect of the disclosure is directed to an extender port comprising a shell, a first connection port, a second connection port, and at least one securing feature associated with the connection port passageway. The first connection port is disposed on the extender port with the at least one connection port comprising an optical connector opening extending from an outer surface of the extender port into a cavity of the extender port and defining a first connection port passageway. The second connection port is disposed on the extender port with the at least one connection port comprising an optical connector opening extending from an outer surface of the extender port into a cavity of the extender port and defining a second connection port passageway. The second connection port passageway being aligned with the first connection port passageway. The at least one securing feature comprising a bore, and wherein the at least one securing feature translates from a retain position to an open position as a suitable fiber optic connector is inserted into the at least one connection port.

One more aspect of the disclosure is directed to an extender port comprising a shell, a first connection port, a second connection port, and at least one securing feature associated with the connection port passageway. The first connection port is disposed on the extender port with the at least one connection port comprising an optical connector opening extending from an outer surface of the extender port into a cavity of the extender port and defining a first connection port passageway. The second connection port is disposed on the extender port with the at least one connection port comprising an optical connector opening extending from an outer surface of the extender port into a cavity of the extender port and defining a second connection port passageway. The second connection port passageway being aligned with the first connection port passageway. The at least one securing feature comprising a bore and a locking feature, and the at least one securing feature is capable of translating within a portion of the shell, wherein the at least one securing feature translates from a retain position to an open position as a suitable fiber optic connector is inserted into the at least one connection port.

Yet another aspect of the disclosure is directed to an extender port comprising a shell, a first connection port, a second connection port, and at least one securing feature associated with the connection port passageway. The first connection port is disposed on the extender port with the at least one connection port comprising an optical connector opening extending from an outer surface of the extender port into a cavity of the extender port and defining a first connection port passageway. The second connection port is disposed on the extender port with the at least one connection port comprising an optical connector opening extending from an outer surface of the extender port into a cavity of the extender port and defining a second connection port passageway. The second connection port passageway being aligned with the first connection port passageway. The at least one securing feature comprising a locking member and an actuator, and the at least one securing feature is capable of translating within a portion of the shell, wherein the at least one securing feature translates from a retain position to an open position as a suitable fiber optic connector is inserted into the at least one connection port.

The disclosure is also directed to methods for making extender port as disclosed. One method of making an extender port comprises providing a shell comprising a first connection port having an optical connector opening and a connection port passageway. The method includes assembling at least one securing feature so it is associated with a connection port passageway of the shell securing, and installing at least one securing feature resilient member for biasing a portion of the at least one securing feature. Other methods for making devices such as extender ports as disclosed herein are also contemplated.

Still another method of making an extender port comprises providing a shell with a first connection port comprising an optical connector opening extending from an outer surface of the extender port into a cavity of the extender port and defining a first connection port passageway, and a second connection port comprising an optical connector opening extending from an outer surface of the extender port into a cavity of the extender port and defining a second connection port passageway, where the second connection port passageway is aligned with the first connection port passageway. The method includes assembling at least one securing feature so it is associated with a connection port passageway of the shell, and installing at least one securing feature resilient member for biasing a portion of the at least one securing feature. Other steps for the methods are described here and may also comprise assembling the securing feature with any of forms disclosed.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 10-12 are various perspective views of a securing features of the fiber optic extender port of FIG. 1;

DETAILED DESCRIPTION

Figure 1:
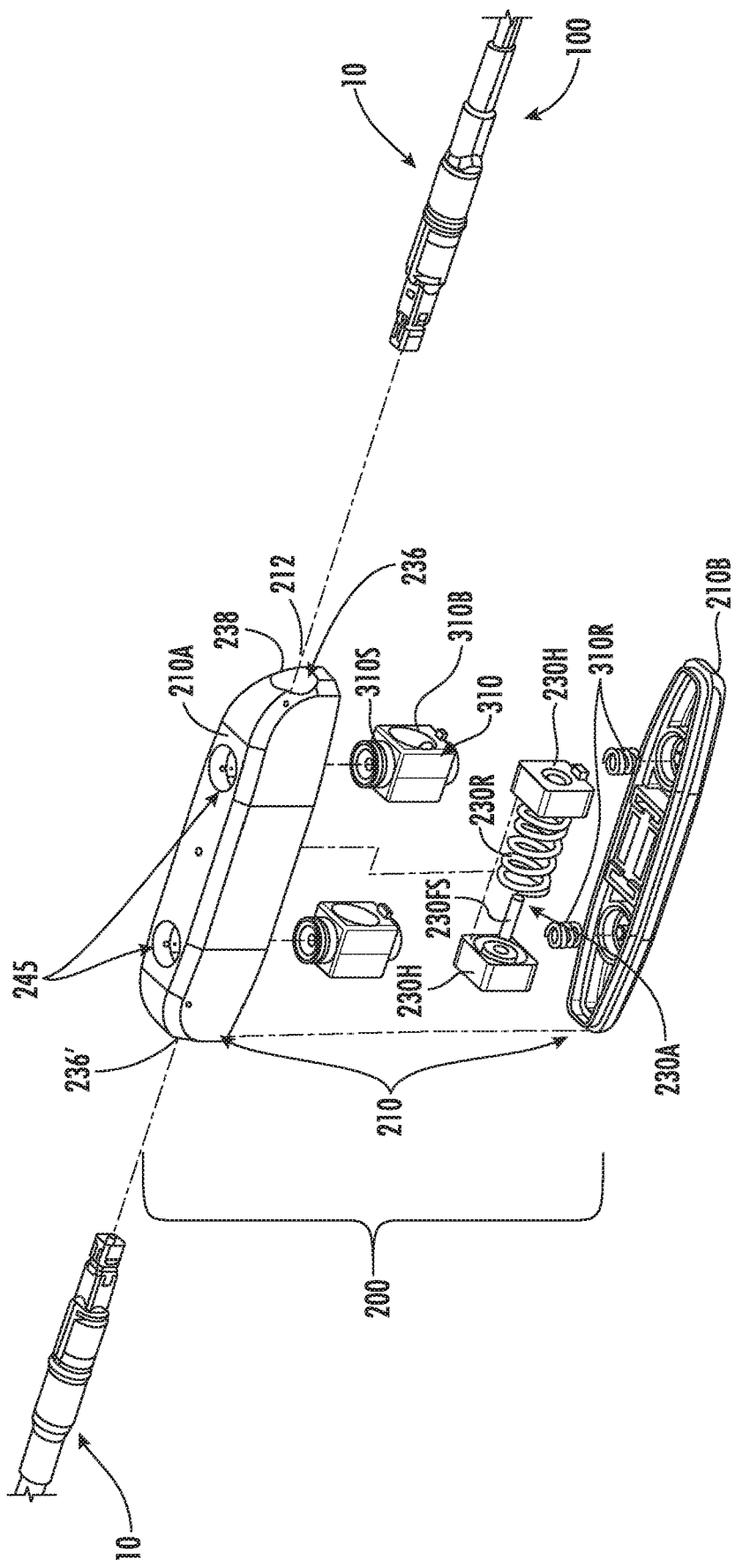
FIG. 1 is an exploded view of an explanatory fiber optic extender port according to the concepts disclosed for mating one or more external fiber optic connectors to the fiber optic extender port.

Reference will now be made in detail to the embodiments of the disclosure, examples of which are illustrated in the accompanying drawings. Whenever possible, like reference numbers will be used to refer to like components or parts.

The concepts for the devices disclosed herein are suitable for providing at least one optical connection for indoor, outdoor or other environments as desired. Generally speaking, the devices disclosed and explained in the exemplary embodiments are extender ports, but the concepts disclosed may be used with any suitable device as appropriate. As used herein, the term "extender port" means any device comprising a first connection port for receiving a fiber optic connector and making an optical connection. In one embodiment, the extender port has a first connection port and a second connection port that are aligned for making an optical connection between two external fiber optic connectors. Thus, the extender port may be used to customize or extend the length of an optical link by using two cables connected by the extender port, thereby providing further flexibility to the network provider. In other embodiments, the extender port can be fixed to a tether cable for optical connection with an external connector. The connection port also has a securing feature associated with the at least one connection port for securing and releasing the fiber optic connector. By way of example, the extender port may further include other components such as active components such as a wireless sub-assembly device having electronics for transmitting or receiving a signal disposed within the shell of the extender port.

The concepts disclosed advantageously allow compact form-factors for the extender ports and may also optionally include at least one connection port comprising a keying portion for aligning the fiber optic connector with the securing feature associated with the connection port. Although, extender ports are shown and described for a single inline connection, the concepts are scalable to many in-line connection ports on a single device in a variety of arrangements or constructions. The securing features disclosed herein for devices engage directly with a portion of connector without conventional structures like prior art devices that require the turning of a coupling nut, bayonet or the like. As used herein, "securing feature" excludes threads and features that cooperate with bayonets on a connector. Thus, the devices disclosed may allow connection port to be closely spaced and may result in small devices since the room and structure needed for turning a threaded coupling nut or bayonet is not necessary. The compact form-factors may allow the placement of the devices in tight spaces in indoor, outdoor, buried, aerial, industrial or other applications while advantageously providing a device having at least one connection port with a robust and reliable optical connection in a removable and replaceable manner. The disclosed devices may also be aesthetically pleasing. Organizers may also be used with the extender ports for providing organization for an array of extender ports having optical connections.

The devices disclosed are simple and elegant in their designs. The devices disclosed comprise at least one connection port and a securing feature associated with the connection port that is suitable for retaining an external fiber optic connector received by the connection port. A keying portion of the connection port may cooperates with a key on a complimentary external fiber optic connector to inhibit damage to the connection port by inhibiting the insertion of a non-compliant connector while also ensuring the correct rotational alignment to secure the fiber optic connector. The keying portion may also aid the user during blind insertion of the connector into the connection port of the device to determine the correct rotational orientation with respect to the connection port when a line of sight is not possible or practical for alignment. The keying portion may be an additive keying portion to the primitive geometric round shape of the connection port passageway 233 such as a male key. However, the concepts for the connection ports 236 of devices may be modified for different connector designs without a keying portion as well.

The concepts disclosed advantageously allow the quick and easy connection and retention by inserting the fiber optic connectors directly into the connection port of the device without the need or space considerations for turning a threaded coupling nut or bayonet for retaining the external fiber optic connector. Generally speaking, the securing features disclosed for use with extender ports herein may comprise one or more components with at least one component translating for releasing or securing the external fiber optic connector to the device. Specifically, the securing feature is capable of translating within the shell. As used herein, the term "securing feature" excludes threaded portions or features for securing a bayonet disposed on a connector.

Since the connector footprint used with the devices disclosed does not require the bulkiness of a coupling nut or bayonet, the fiber optic connectors used with the devices disclosed herein may also be significantly smaller than conventional fiber optic connectors.

The devices disclosed comprise a securing feature for directly engaging with a suitable portion of a connector housing of the external fiber optic connector or the like for securing an optical connection with the device. Different variations of the concepts are discussed in further detail below. The structure for securing the fiber optic connectors in the devices disclosed allows much smaller footprints for both the devices and the fiber optic connectors along with a quick-connect feature. Although shown as simplex devices, the device may also have a dense spacing of connection ports within a shell such as a duplex designs or beyond if desired. The concepts disclosed advantageously allow a scalable and relatively dense and organized array of connection ports in a relatively small form-factor while still being rugged for demanding environments.

The concepts disclosed herein are suitable for optical distribution networks such as for Fiber-to-the-Home or 5G applications, but are equally applicable to other optical applications as well including indoor, automotive, industrial, wireless, or other suitable applications. Additionally, the concepts disclosed may be used with any suitable fiber optic connector footprint that cooperates with the securing feature of the device, Various designs, constructions, or features for devices are disclosed in more detail as discussed herein and may be modified or varied as desired.

FIG. 1 is an exploded view of explanatory extender port 200 comprising at least one connection port 236 for making optical connections. Generally speaking, extender port 200 comprises at least one connection port 236 being a portion of a shell 210 of the device. By way of explanation, at least one connection ports 236 is molded as a portion of shell 210.

Figure 2:
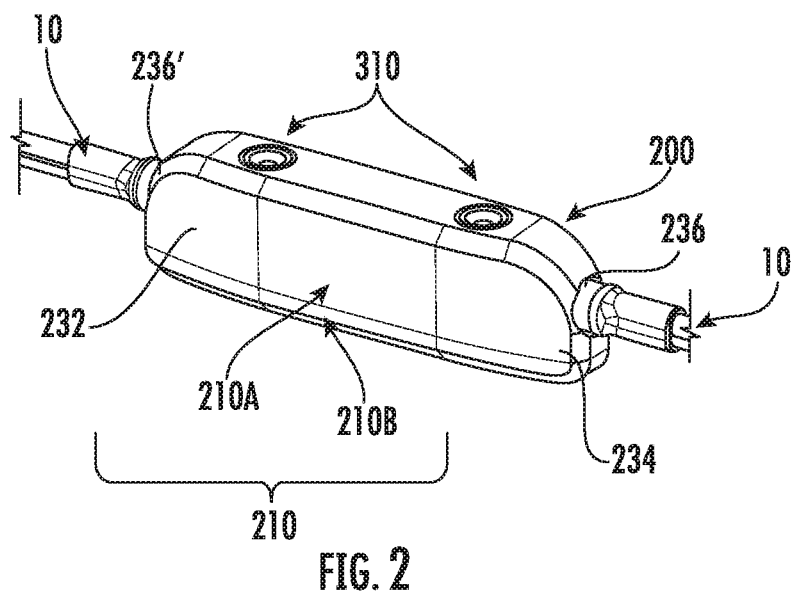
FIG. 2 is a perspective view of the fiber optic extender port of FIG. 1 with fiber optic connectors inserted and secured in the connection ports of the fiber optic extender port.

Generally speaking, extender port 200 comprises a shell 210 comprising a body 232 and one or more connection ports 236 disposed on a first end or portion 212 of extender port 200. The connection ports 236 are configured for receiving and retaining external fiber optic connectors 10 such as shown in FIG. 2 for making one or more optical connections within the extender port 200. In the embodiment of FIG. 1, fiber optic connectors 10 are received from each end of the extender port 200 for making an optical connection between the fiber optic connectors 10 within the device. Although, single-fiber connectors 10 are shown, the concepts may be used with multi-fiber connectors as well.

Figure 2A:
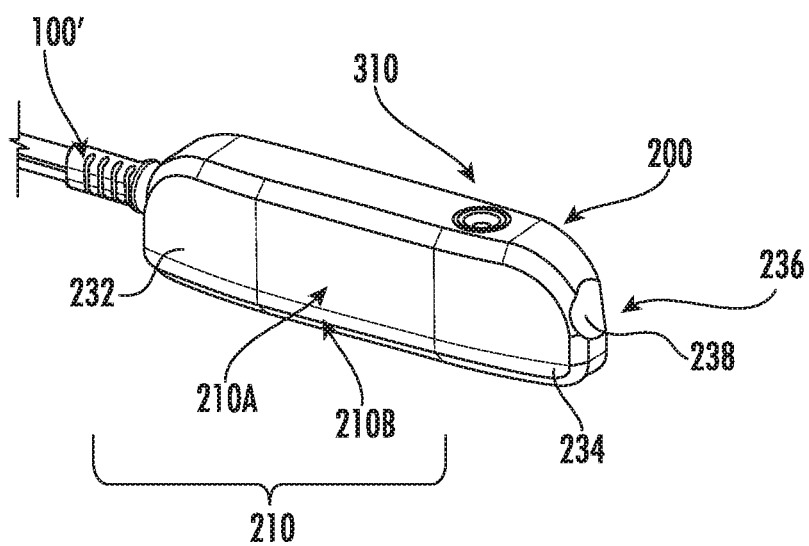
FIG. 2A is a perspective view of another fiber optic extender port similar to FIG. 1 with a single fiber optic connector inserted and secured in the connection port for making an optical connection with a tether cable that is fixed to the fiber optic extender port.

Extender port 200 of FIG. 1 comprises a first connection port 236 and a second connection port 236' that are inline or aligned for making an optical connection between fiber optic connectors 10 that are inserted from respective ends of the extender port 200. In other embodiments, the extender port may have a fixed cable 100 on one end and a single connector port 236 for making an optical connection with optical fibers of the fixed cable such as shown in FIG. 2A.

Connection ports 236 each comprise a respective optical connector opening 238 extending from an outer surface 234 of the extender port 200 into a cavity 216 of the extender port 200 and defining a connection port passageway 233. At least one securing feature 310 is associated with the connection port passageway 233 for cooperating with the external fiber optic connector 10, The securing feature may translate for releasing or securing the external fiber optic connector 10. One or more respective securing feature passageways 245 such as shown in FIG. 1 extend from the outer surface 234 of extender port 200 and cooperate with the respective connection port passageways 233 of the extender port 200. Respective securing features 310 are associated with the connection port passageways 233 and may have a portion of the securing feature 310 disposed within a portion of the securing feature passageway 245 of the extender port 200.

Optical connections to the extender ports 200 are made by inserting one or more suitable external fiber optic connectors 10 into respective connection port passageways 233 as desired. Specifically, the connection port passageway 233 is configured for receiving a suitable external fiber optic connector 10 (hereinafter connector) of a fiber optic cable assembly 100 (hereinafter cable assembly). Each connection port passageway 233 is associated with a securing feature 310 for retaining (e.g., securing) connector 10 in the extender port 200. The securing feature 310 advantageously allows the user to make a quick and easy optical connection at the connection port 236 of extender ports 200 by pushing the connector 10 into the port until it is secured. The securing feature 310 may operate for providing a connector release feature when actuated such as by pushing downward.

Specifically, the connector 10 may be retained within the respective connection port 236 of the device by pushing and fully-seating the connector 10 within the connection port 236 as shown in FIG. 2. To release the connector 10 from the respective connection port 236, the securing feature 310 is actuated by pushing downward to translate the securing feature 310 a suitable distance, thereby releasing the securing feature from the connector housing and allowing the connector to be removed from the connection port 236. Stated another way, the at least one securing feature 310 is capable of releasing the connector 10 when translating within a portion of a securing feature passageway 245. The full insertion and automatic retention of the connector 10 may advantageously allow one-handed installation of the connector 10 by merely pushing the connector into the connection port 236. The extender ports 200 disclosed accomplish this connector retention feature upon full-insertion by biasing the securing feature to a retain position. However, other modes of operation for retaining and releasing the connector 10 are possible according to the concepts disclosed. For instance, the securing feature 310 may be designed to require actuation for inserting the connector 10; however, this may require a two-handed operation.

Securing feature 310 may be designed for holding a minimum pull-out force for connector 10. In some embodiments, the pull-out force may be selected to release the connector 10 before damage is done to the device or the connector 10. By way of example, the securing feature 310 associated with the connection port 236 may require a pull-out force of about 50 pounds (about 220 N) before the connector 10 would release. Likewise, the securing feature 310 may provide a side pull-out force for connector 10 for inhibiting damage as well. By way of example, the securing feature 310 associated with the connection port 236 may provide a side pull-out force of about 25 pounds (about 110 N) before the connector 10 would release. Of course, other pull-out forces such as 75 pounds (about 330 N) or 100 (about 440 N) pounds are possible along with other side pull-out forces.

Figure 13:
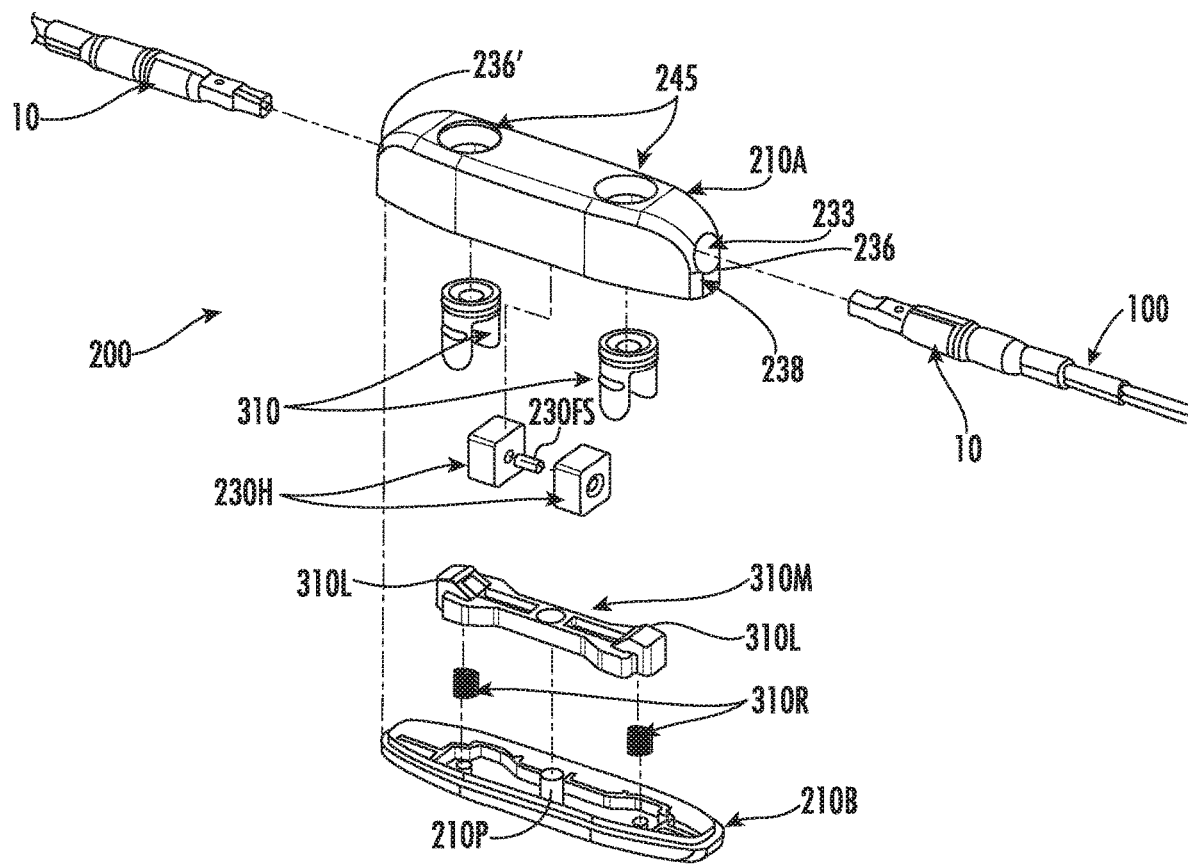
FIG. 13 is an exploded view of another explanatory fiber optic extender port using a single securing feature having two locking features according to the concepts disclosed for mating fiber optic connectors.
Figure 19:
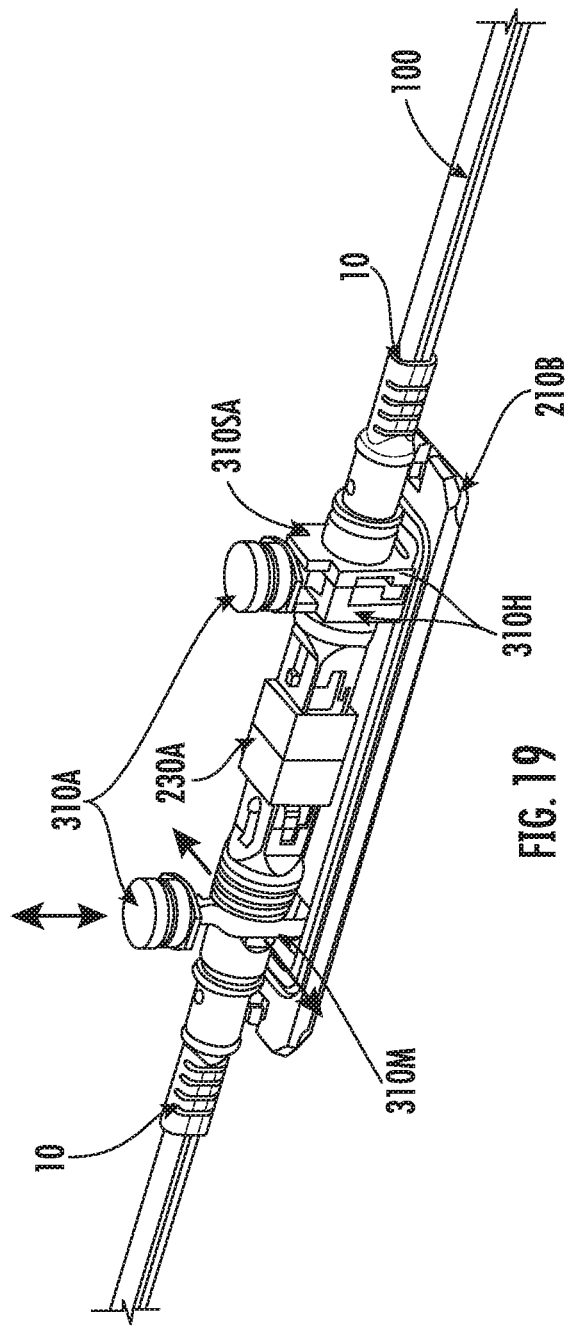
FIG. 19 is a top perspective assembly view of the fiber optic extender port of FIG. 18 with the top shell removed.

The securing features 310 disclosed herein may take many different constructions or configurations. By way of explanation, securing features 310 may be formed from a single component as shown in FIG. 1 or a plurality of components as shown in FIG. 19. Furthermore, the securing features 310 or portions of securing features 310 may be constructed as sub-assemblies such as shown in FIG. 19 for easy assembly. Still other variations are possible. FIG. 13 depicts a single securing feature 310M having opposing locking features that cooperates with mating connection ports 236.

Generally speaking, the extender ports 200 comprise at least one connection port 236 defined by an optical connector opening 238 extending into a cavity 216 of the extender port 200 along with a securing feature 310 associated with the connection port 236.

More specifically, FIG. 1 is an exploded view of extender port 200 comprising at least one connection port 236 disposed on the extender port 200 with the connection port 236 defined by an optical connector opening 238 extending from an outer surface 234 of the extender port 200 into a cavity 216 of the extender port 200 and defining a connection port passageway 233. Extender port also comprises at least one securing feature passageway 245 for receiving at least a portion of the securing feature 310. Securing features 310 are biased to a retain position using respective resilient members 310R. The securing feature passageways 245 extend from the outer surface 234 of extender port 200. This extender port 200 comprises a shell 210 having a first portion 210A and a second portion 210B along with an adapter assembly 230A.

FIG. 1 depicts connectors 10 aligned at opposite ends of the extender port 200 for insertion into respective connection ports 236 and FIG. 2 depicts a plurality of connectors 10 retained within respective connection ports 236 of the assembled extender port 200. As shown in NG. 2A, extender ports 200 may have a fixed tether cable 100 attached at one end and a mating optical connection port 236 for receiving connector 10 at the other end according to the concepts disclosed.

By way of explanation, the one or more connection ports 236 and the one or more securing feature passageways 245 are a portion of the shell 210. illustratively, FIGS. 1 and 2 depict extender port 200 comprising a shell 210 comprising a body 232 with a first connection ports 236 disposed on a first end or portion 212 and a second connection port 236' disposed on an opposite end. Each connection port 236,236' comprises a respective optical connector opening 238. The optical connector openings extend from an outer surface 234 of shell 210 of the extender port 200 into a cavity 216 and define a respective connection port passageway 233,233'. One or more respective securing feature passsageways 245 extend from the outer surface 234 of the shell 210 to cooperate with the respective connection port passageways 233, 233'. The second connection port passageway (233') is aligned with the first connection port passageway (233) so that respective external connectors 10 may be optical mated using the extender port 200. As depicted in FIG. 1, shell 210 is formed by a first portion 210A and a second portion 210B, but other arrangements are possible for shell 210.

Figure 4:
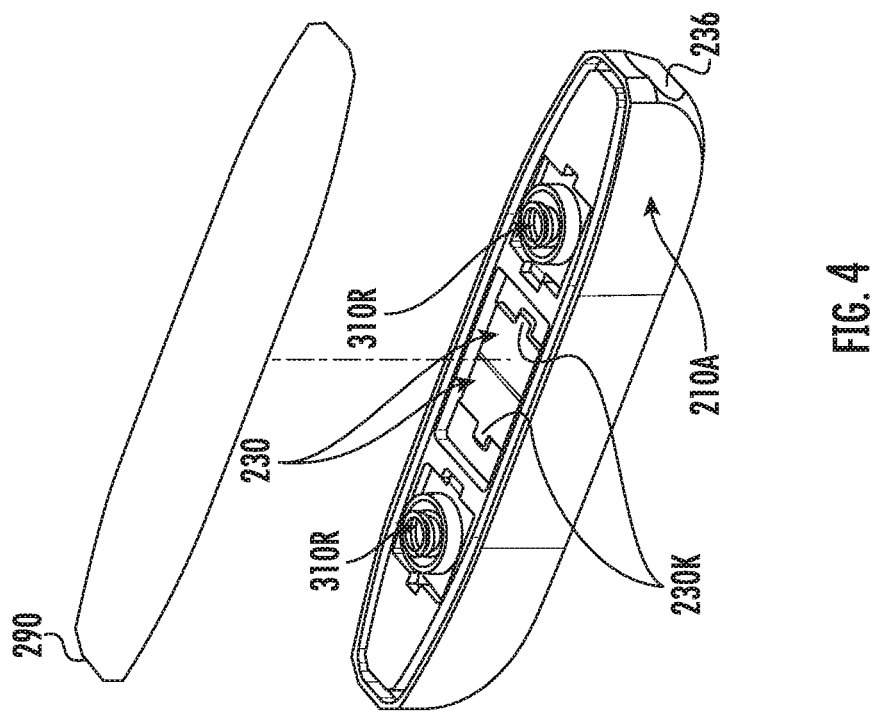
FIG. 4. depicts a bottom perspective assembly view of the fiber optic extender port of FIG. 3 with the bottom shell removed.
Figure 3:
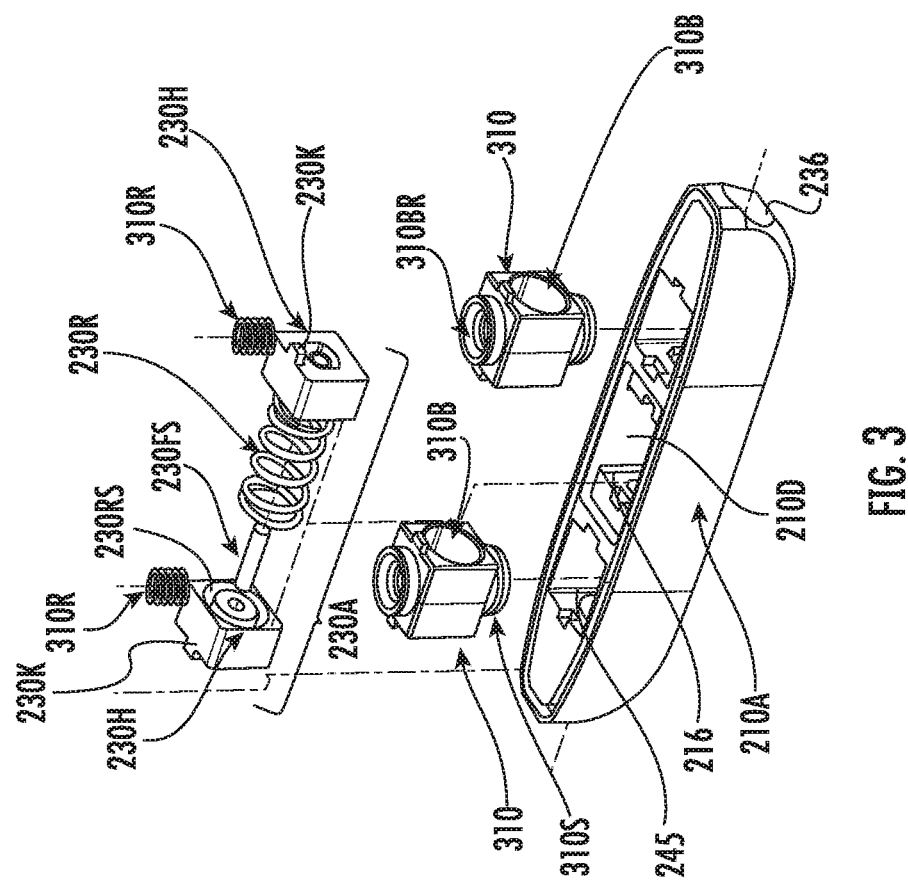
FIG. 3 depicts a partially exploded bottom view of the fiber optic extender port of FIG. 1 with the bottom shell excluded.
Figure 5:
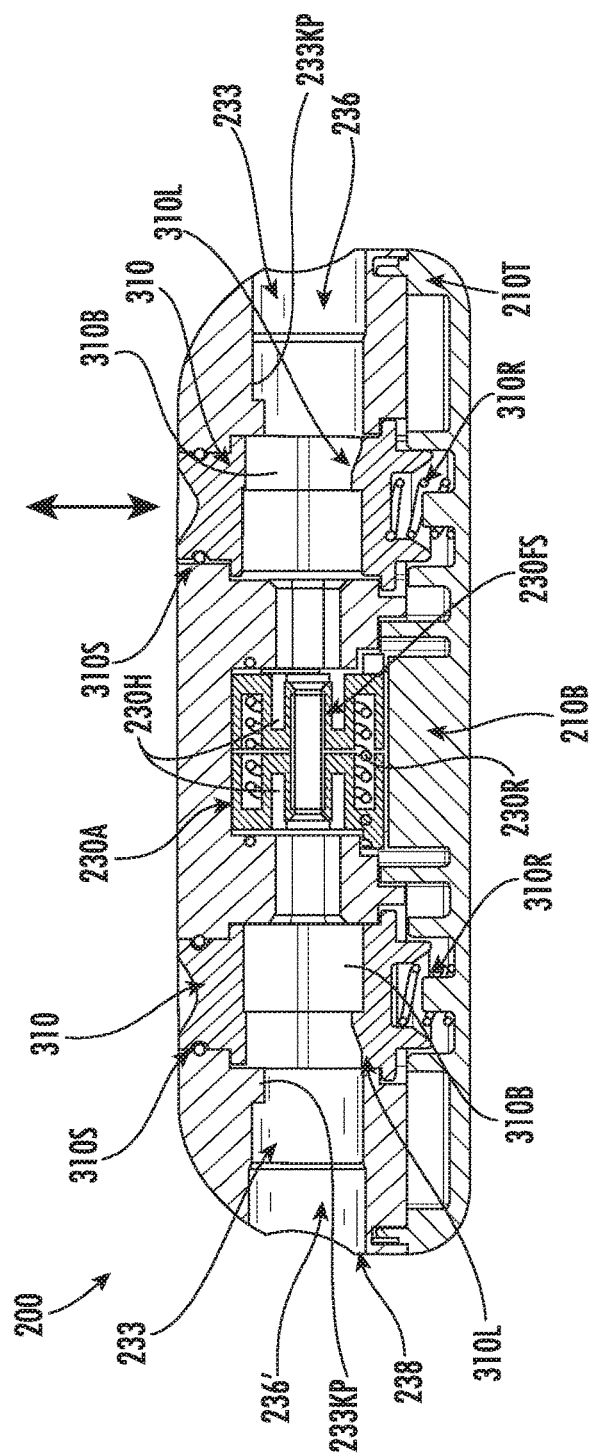
FIG. 5 is a cross-sectional view of the fiber optic extender port of FIG. 1 with no fiber optic connectors attached.

FIG. 3 is an exploded view showing the second portion 210B of shell 210 removed from the first portion 210A and showing the internal assembly of extender port 200. FIGS. 3 and 4 show the assembly of the extender port 200 of FIG. 1. FIG. 5 shows a longitudinal cross-section through the connection port passageway 233 of an assembled extender port 200 with no connectors attached.

As shown in FIG. 5, securing feature 310 is biased to a retain position. Specifically, the securing feature 310 is biased in an upward direction using a securing feature resilient member 310R that is positioned between the securing feature 310 and shell 210. Consequently, a portion of securing feature 310 is capable of translating within a portion of the securing feature passageway 245. As depicted, a sealing feature 310S is disposed on the securing feature 310. Sealing feature 310S provides a seal between the securing feature 310 and the securing feature passageway 245 to inhibit dirt, dust and debris from entering the device.

As best depicted in FIG. 5, this connection port passageway 233 may comprise a keying portion 233KP as part of the extender port 200. As shown, keying portion 233KP is disposed forward of the securing feature 310 (i.e., before) in the connection port passageway 233 upon entry of the passageway. The keying portion 233KP may have any suitable location in the connection port passageway 233 forward of the securing feature. As depicted, the extender port 200 has the securing features 310 associated with each connection port passageway 233 that cooperate with a portion of the securing feature passageway 245. In this embodiment, the securing feature 310 is a push-button actuator formed as a single component with the locking feature 310L.

Extender port may also have a keying portion 233KP disposed on the optical connector opening 238 side of the securing feature 310. Keying portion 233KP inhibits the insertion of a non-compliant connector into connection port 236, thereby inhibiting damage that may be caused to the device. Suitable connectors 10 have a complimentary keying feature that cooperates with the keying portion 233KP of extender port 200. Keying portion 233KP may be a protrusion or additive feature disposed within the connection port passageway 233 on the optical connector opening 238 side of the securing feature 310 and may take several different configuration if used. For instance, keying portion 233KP may be a simple protrusion as shown. In other embodiments, the keying portion 233KP may take the shape of a D-shaped opening to allow only a suitable connector 10 having a complimentary feature to be inserted into the connection port 236. The keying portion 233KP may also aid with blind mating a connector 10 into the connection port 236 since it only allows further insertion into the connection port 236 when the connector is in the proper rotational orientation.

Extender port 200 of FIG. 1 also comprises at least one adapter assembly 230A aligned with one or more of the respective connection ports 236 when assembled. Adapter assembly 230A is suitable for aligning the respective ferrules of connectors 10 that are inserted into connection ports 236. Adapter assembly 230A may comprise a ferrule sleeve 230FS, an adapter housing formed from one or more components 230H, and a resilient member 230R as shown in FIGS. 1 and 3. Ferrule sleeve 230FS receives a portion of the respective ferrule 10F of connectors 10 for precision alignment.

FIGS. 3 and 4 depict the assembly of extender port 200 of FIG. 1. FIG. 3 depicts the securing feature 310 being aligned for installation into the securing feature passageway 245 of the first portion 210A of shell 210. As depicted, keying features 310K of securing feature 310 (FIGS. 10-12) are aligned with the features of the securing feature passageway 245, which only allow assembly in one orientation for the correct orientation of the locking feature 310L in the extender port 200. FIG. 3 also shows adapter 230A in an exploded view before being aligned and installed into the saddle 210D of first portion 210A of shell 210. Once seated, the resilient member 230R of adapter 230A biases the housing 210H components outward and provides the ability for the ferrule sleeve 230FS or adapter 230A to "float" relative to the shell 210. "Float" means that the adapter 230A can have slight movement in the X-Y plane for alignment, and may be inhibited from over-traveling in the Z-direction along the axis of connector insertion so that suitable alignment may be made between mating connectors. Once the adapter 230A is installed into first portion 210A, the biasing force on housing components 230H holds the adapter 230A in place until the second portion 210B of shell 210 is attached as depicted in FIG. 5.

In other embodiments, adapters 230A may be formed from several components, but some adapters or portions thereof could be integrally formed with the extender port as well.

FIG. 4 depicts is a partial assembled view of extender port 200 showing adapter 230A installed into the first portion 210A of the shell 210, and the respective securing feature resilient members 310R placed on a bottom portion of securing feature 310 before the second portion 210B of shell 210 is attached to trap the securing feature resilient members 310R in place. Securing feature 310 may have a bottom recess 310BR or ring for seating the securing feature resilient members 310R and centering the restoring force on the securing feature 310 as best shown in FIG. 5. Thereafter, the second portion 210B of shell 210 may be attached to the first portion 210A is a suitable fashion using a sealing element 290 or not.

In this embodiment, the securing feature 310 comprises a bore 310B that is aligned with the least one connection port passageway 233 when assembled as best shown in FIG. 5. Bore 310B is sized for receiving a suitable connector 10 therethrough for securing the same for optical connectivity. Bores or openings through the securing feature 310 may have any suitable shape or geometry for cooperating with its respective connector. As used herein, the bore may have any suitable shape desired including features on the surface of the bore for engaging with a connector for securing the same.

In some embodiments, the securing feature 310 is capable of moving to an open position when inserting a suitable connector 10 into the connection port passageway 233. When the connector 10 is fully-inserted into the connector port passageway 233, the securing feature 310 is capable of moving to the retain position automatically. Consequently, the connector 10 is secured within the connection port 236 by securing feature 310 without turning a coupling nut or a bayonet like the prior art devices. Stated another way, the securing feature 310 translates from the retain position to an open position as a suitable connector 10 is inserted into the connection port 236. Then, when connector 10 is fully-seated the securing feature 310 is biased back to the retain position to secure the connector 10 in the connection port 236. The securing feature passageway 245 is arranged transversely to a longitudinal axis LA of the extender port 200, but other arrangements are possible. Other securing features may operate in a similar manner, but use an opening instead of a bore that receives the connector therethrough.

Figure 7:
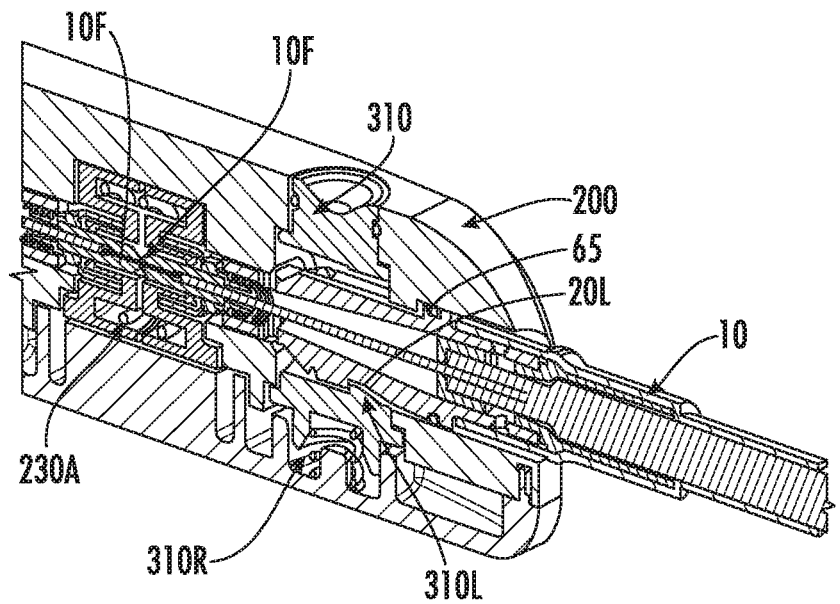
FIG. 7 is a detailed partial cross-sectional view of the fiber optic extender port of FIG. 1 with a fiber optic connector inserted into a connection port.
Figure 8:
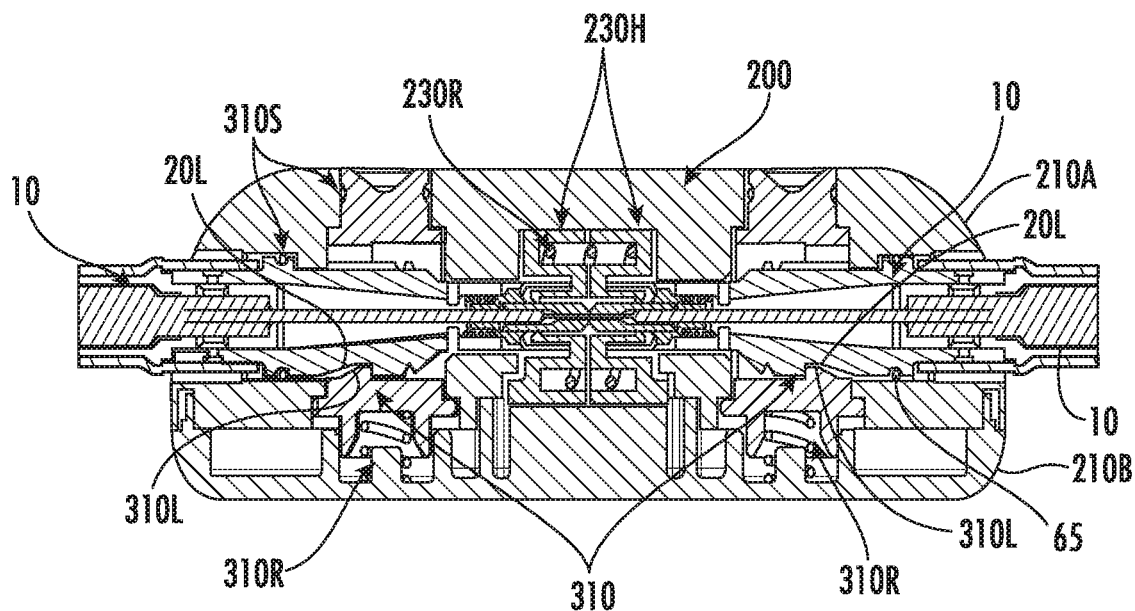
FIG. 8 is a cross-sectional view of the fiber optic extender port of FIG. 1 showing a first fiber optic connector mated with a second fiber optic connector that are inserted and secured in respective connection ports.
Figure 9:
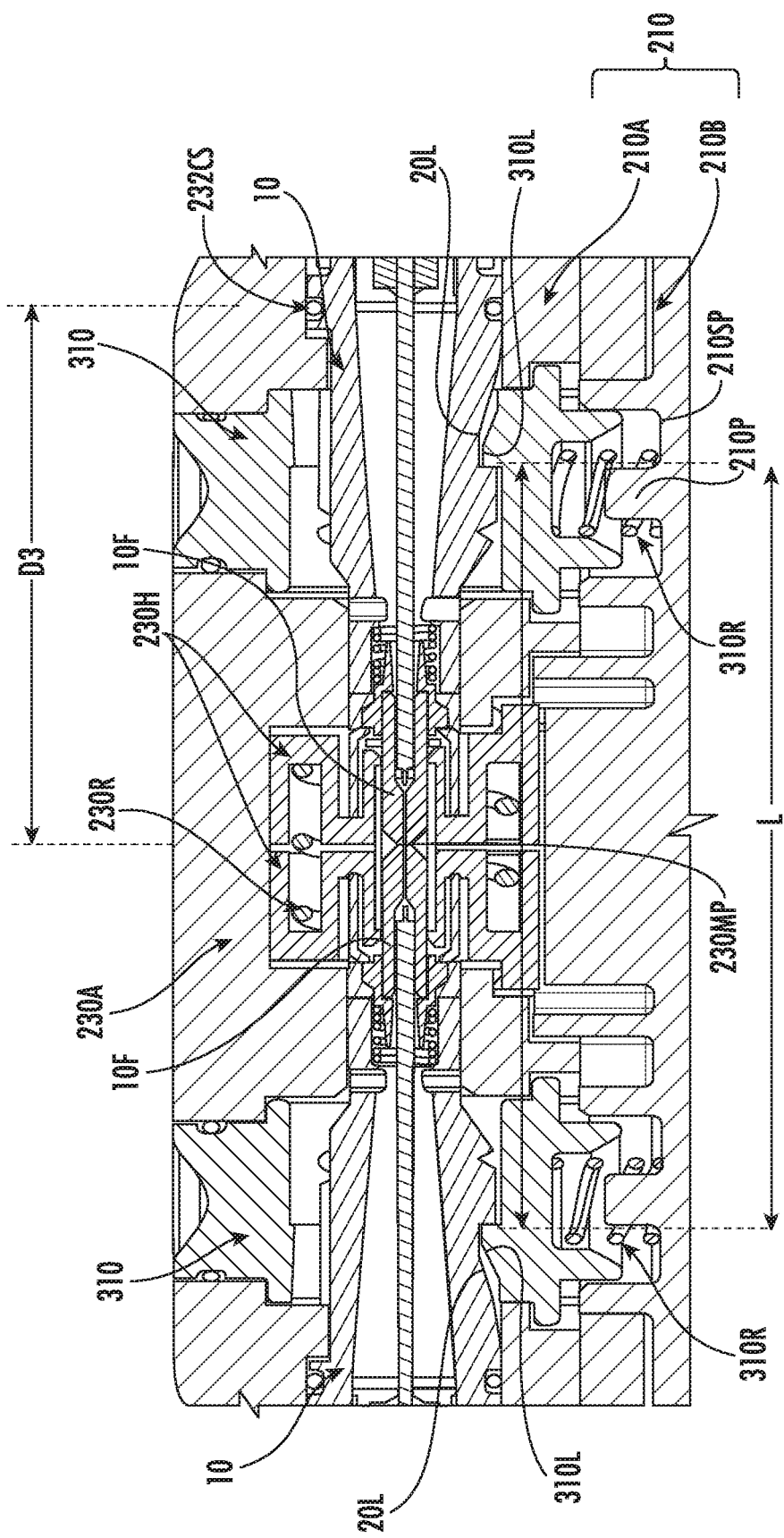
FIG. 9 is a detailed cross-sectional view of the fiber optic extender port of FIG. 8.

As shown in FIG. 5, securing feature 310 comprises a locking feature 310L. Locking feature 310L cooperates with a portion of the connector 10 when it is fully-inserted into the connection port 236 for securing the same. Specifically, the connector housing 20 of connector 10 may have a cooperating geometry that engages the locking feature 310L of securing feature 310. In this embodiment, securing feature 310 comprise a bore 310B that is respectively aligned with the respective connector port passageway 233 as shown in FIG. 5 when assembled. The bore 310B is sized for receiving a portion of connector 10 therethrough. FIGS. 7-9 are longitudinal cross-sectional views of extender port 200 depicting the optical connection port 236 of the extender port 200 with a connector 10 retained therein.

As depicted in this embodiment, locking feature 310L is disposed within bore 310B. Specifically, locking feature 310L comprises a ramp in this embodiment. The ramp is integrally formed at a portion of the bore 310B with the ramp angling up when looking into the connection port 236. The ramp allows the connector 10 to push and translate the securing feature 310 downward against the securing feature resilient member 310R as the connector 10 is inserted in the connection port 236 as shown. Ramp may have any suitable geometry such as a retention surface such as a ledge at the backside or the ramp may lead to a flat portion before the retention surface. Once the locking feature 310L of the securing feature 310 is aligned with the cooperating geometry of the locking feature 20L of connector 10, then the securing feature 310 translates so that the locking feature 310L engages the locking feature 20L of connector 10 as shown in FIGS. 7-9. Detailed views of the securing feature 310 of FIG. 1 are shown in FIGS. 10-12.

The sealing between the components of shell 210 may comprise a sealing element (not visible) disposed between the components. The sealing may comprise a groove in one portion of the shell that cooperates with a tongue on the other portion of the shell 210. Grooves may extend about the perimeter of sealing surface. Grooves may receive one or more appropriately sized O-rings or gaskets for weather-proofing extender port 200. The O-rings are suitably sized for creating a seal between the components of the shell 210. By way of example, suitable O-rings may be a compression O-ring for maintaining a weatherproof seal. Other embodiments may use an adhesive or suitable welding of the materials such as ultrasonic or induction welding with appropriate materials for sealing the extender port 200.

Figure 6:
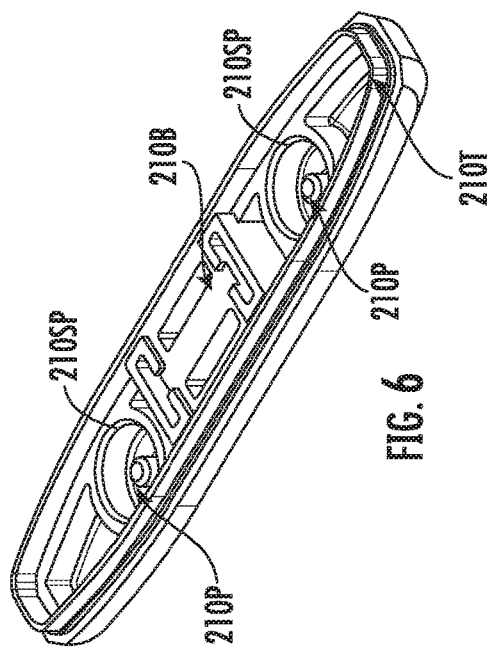
FIG. 6 is a perspective view of the bottom shell of the fiber optic extender port of FIG. 1 showing the internal features.

FIG. 6 depicts a perspective view showing details of the second portion 210B of shell 210 of FIG. 1. Second portion 210B of shell 210 comprises at least one pin 210P disposed within a securing member pocket 210SP. The pin 210P and the securing member pocket 210SP cooperate to align and seat the resilient member 310R between the second portion 210B of shell 210 and the securing feature 310 for biasing the securing feature 310 to a retain position.

In this embodiment, shell 210B also comprises a tongue 210T near an outer periphery that may cooperate with a groove 210G construction on the first portion 210A of the shell 210 for alignment and/or sealing of the device. The interface between components of the shell may have other structure or features for securing or sealing the components such as fasteners for securing the components of the shell or an adhesive, o-ring or gasket or weldable feature for sealing. Shells 210 may have any suitable shape, design or configuration as desired. Shells 210 may comprise at least one rib or support 210S, thereby providing crush support for the extender port 200 and resulting in a robust structure. Further, shells 210 may comprise more than two portions if desired. Likewise, multiple portions of the shell 210 may comprise connection ports 236.

Any of the extender port 200 disclosed herein may optionally be weatherproof by appropriately sealing seams of the shell 210 between components using any suitable means such as gaskets, O-rings, adhesive, sealant, welding, overmolding or the like. Moreover, the interface between the connection ports 236 and the dust cap or connector 10 may be sealed using appropriate geometry and/or a sealing element such as an O-ring or gasket 65 on the connector or dust cap. If the extender port 200 is intended for indoor applications, then the weatherproofing may not be required.

Extender port 200 may also comprise integrated mounting features. By way of explanation, shell 210 may have mounting features configured as passageways disposed on the lateral sides. Thus, the user may simply use a fastener such as a zip-tie threaded thru these lateral passageways for mounting the extender port 200 to a wall or pole as desired.

As shown in FIG. 9, the connector mating plane 230MP between the ferrules 10F of connectors 10 is disposed within the cavity 216 extender port 200. Connectors 10 includes a locking feature 20L on the housing 20 for cooperating with a securing feature 310 of extender port 200. Additionally, the connection ports 236,236' comprise a suitable length L between locking features 310 associated with the connection ports 236,236' so that the connectors 10 may have the proper amount of "float" for suitable optical performance. Connector 10 may comprise at least one O-ring 65 for sealing with the connector port passageway 233 at a sealing surface 233SS when the connector 10 is fully inserted into the connection port 236. Illustratively, connection port 236 has connection port passageway sealing surface 233CS for the connector 10 disposed at a distance D3 from the mating plane 230MP of the connectors 10. Distance D3 is further from the mating plane 230 MP than the locking feature 310L of securing feature 310. The tolerance stack-up of components between the locking features 310L in the distance L should be managed to allow a suitable connector-to-connector interface with the mating ferrules.

FIGS. 10-12 depict detailed perspective views of the securing feature 310 shown by the explanatory device of FIG. 1. Locking feature 310L comprises a retention surface 310RS. In this embodiment, the back-side of the ramp of locking feature 310L forms a ledge that cooperates with complimentary geometry on the connector housing 20 of connector 10. However, retention surface 310RS may have different surfaces or edges that cooperate for securing connector 10 for creating the desired mechanical retention. For instance, the retention surface 310RS may be canted or have a vertical wall for tailoring the pull-out force for the connection port 236. However, other geometries are possible for the retention surface 310RS. Additionally, the connection port 236 has a sealing location at a connection port passageway sealing surface with the connector 10 that is located closer to the optical connector opening 238 at the outer surface 234 than the securing feature 310 or locking feature 310L.

Securing feature 310 may also comprise other features as best depicted in FIGS. 10-12. For instance, securing feature 310 may include a sealing member 310S disposed above the connector port passageway 233 for keeping dirt, debris and the like out of portions of the extender port 200. Sealing member 310S is sized for the retention groove 310RG in the securing feature 310 and the securing feature passageway 245 for sealing.

Securing feature 310 may also comprises one or more guides 310G that cooperate with the shell 210 for keeping the bore 310B in the proper rotational orientation within the respective securing feature passageway 245 during translation. In this embodiment, two guides 310G are arranged about 180 degrees apart and guide the translation of the securing feature 310. Securing feature 310 may also comprise one or more keys 310K that cooperate with the shell 210 or connection port insert 230 for only allowing one assembly orientation into the shell 210 or connection port insert 230, thereby keeping the locking feature 310L in the proper position within the respective securing feature passageway 245 with respect to the connector insertion direction.

Securing feature 310 may also comprise a stop surface 310SS for inhibiting overtravel or the securing feature 310 from being removed from the extender port 200 when assembled. In this embodiment, the stop surface 310SS is disposed as the top surface of guides 310G. Securing feature 310 may also include a dimple 310G or other feature for inhibiting inadvertent activation/translation of the securing feature 310 or allowing a tactical feel for the user. Securing features 310 may also be a different color or have a marking indicia for identifying the port type.

As best shown in FIGS. 10 and 11, locking feature 310L is configured as ramp 310RP that runs to a short flat portion, then to a ledge that reverts to a round cross-section for creating the retention surface 310RS for engaging and retaining the connector 10 once it is fully-inserted into the connector port passageway 233 of the connection port 236. Consequently, the securing feature 310 is capable of moving to an open position (OP) when inserting a suitable connector 10 into the connector port passageway 233 since the connector housing 20 engages the ramp 310RP pushing the securing feature downward during insertion.

The securing feature 310 translates from a retain position (RP) to an open position (OP) as a suitable connector 10 is inserted into the connection port 236. Once connector 10 is fully inserted into connector passageway 233, then the securing feature 310 automatically moves to the retain position (RP) since it is biased upwards to the retain position. This advantageously allows a plug and play connectivity of the connectors 10 with extender port 200 without having to turn a coupling nut or a bayonet like conventional devices. Thus, connections to the extender port may be made faster and in positions that may be awkward with relative ease.

Still other types of securing members 310 may operate in a similar manner for securing connector 10, but comprise more than one component such as an actuator 310A that cooperates with a securing member 310M such as disclosed herein with other embodiments. Additionally, the use of more than one component may allow other arrangements for the securing feature passageway 245 relative to a longitudinal axis LA of the device.

To make identification of the connection ports or easier for the user, a marking indicia may be used such as text or color-coding of extender port or marking the input tether (e.g. an orange or green polymer) or the like.

Any of the extender ports 200 may also have one or more dust caps (not shown) for protecting the connection port 236 from dust, dirt or debris entering the extender port or interfering with the optical performance. Thus, when the user wishes to make an optical connection to the extender port, the appropriate dust cap is removed and then connector 10 of cable assembly 100 may be inserted into the respective connection port 236 for making an optical connection to the extender port 200. Dust caps may use similar release and retain features as the connectors 10. By way of explanation, when securing feature 310 is pushed inward or down, the dust cap is released and may be removed.

Other variations of extender ports 200 are possible according to the concepts disclosed. By way of example, Extender ports 200 of FIGS. 13-18 and 18-24 are similar to extender port 200 of FIG. 1, except they use other mechanisms with the securing feature 310. FIGS. 13-17 depict another explanatory fiber optic extender port 200 according to the concepts disclosed. Extender port 200 of FIGS. 13-17 is similar to extender port 200 of FIG. 1, except it uses a single securing member 310M having opposing locking features 310L. Using two locking features 310L on a common datum of the securing member 310M of FIG. 13 provides easier control of the length L between locking features 310L compared with the tolerance stack-up of multiple components Individual actuators 310A (i.e., two) for cooperating with securing member 310M for releasing and mating the connection ports 236. Like extender port 200 of FIG. 1, resilient members 310R bias securing member 310M upwards to a retain position at each end for the respective connection ports 236, thereby providing a normally locked position for the connection port 236. To release the locking feature 310L of securing member 310M of FIG. 13, either one of the actuator 310A may be pushed downward for translating one end of the securing member 310M downward and moving the locking feature 310L to a release position.

Figure 14:
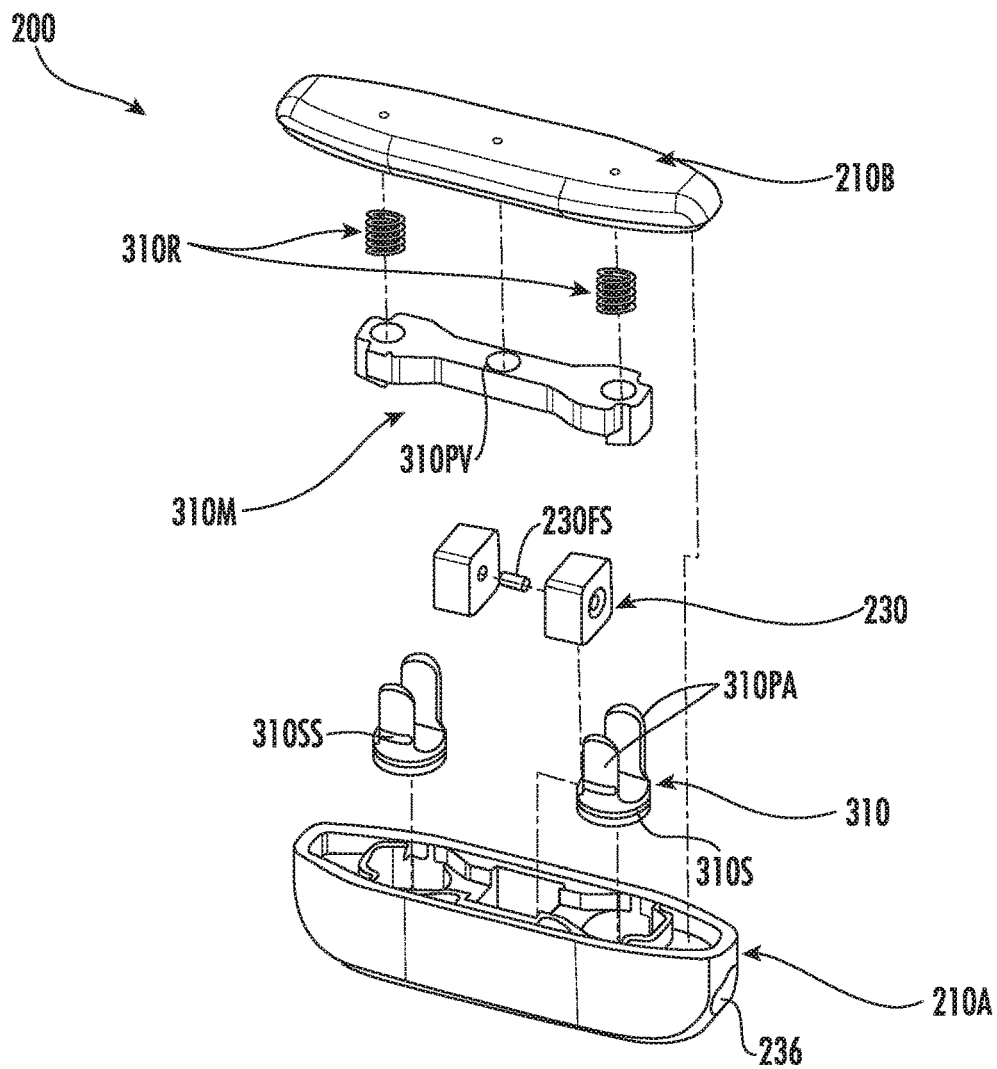
FIG. 14 depicts a partially exploded bottom view of the fiber optic extender port of FIG. 13.
Figure 15:
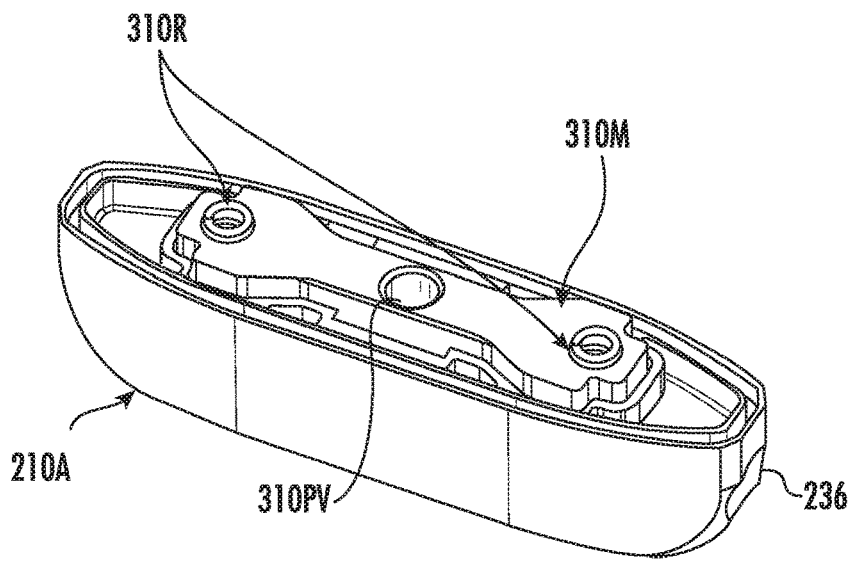
FIG. 15 depicts a bottom perspective assembly view of the fiber optic extender port of FIG. 14 with the bottom shell removed.

FIGS. 13 and 14 depict partially exploded views of the extender port 200 showing details of the construction, and FIG. 15 shows an assembled view with the second portion 210B removed. This extender port 200 has biased securing features that operates in a similar manner as the other extender ports disclosed. However, this extender port 200 uses a securing feature 310 with a common securing member 310M comprising two locking features 310L for avoiding the tolerance stack-up of multiple components in the device for helping preserve optical performance. With reference to FIG. 13, the two locking features 310L on the common securing member 310M are positioned at the desired distance L to allow a suitable connector-to-connector interface between the mating ferrules; and the tolerances and ferrule travel of the connectors may be considered as well. Opposing locking features 310L are molded on a common securing member 310M as depicted in FIGS. 13-16. Locking features 310L of the common securing member 310M may have suitable geometry for securing connectors such as described herein.

Figure 16:
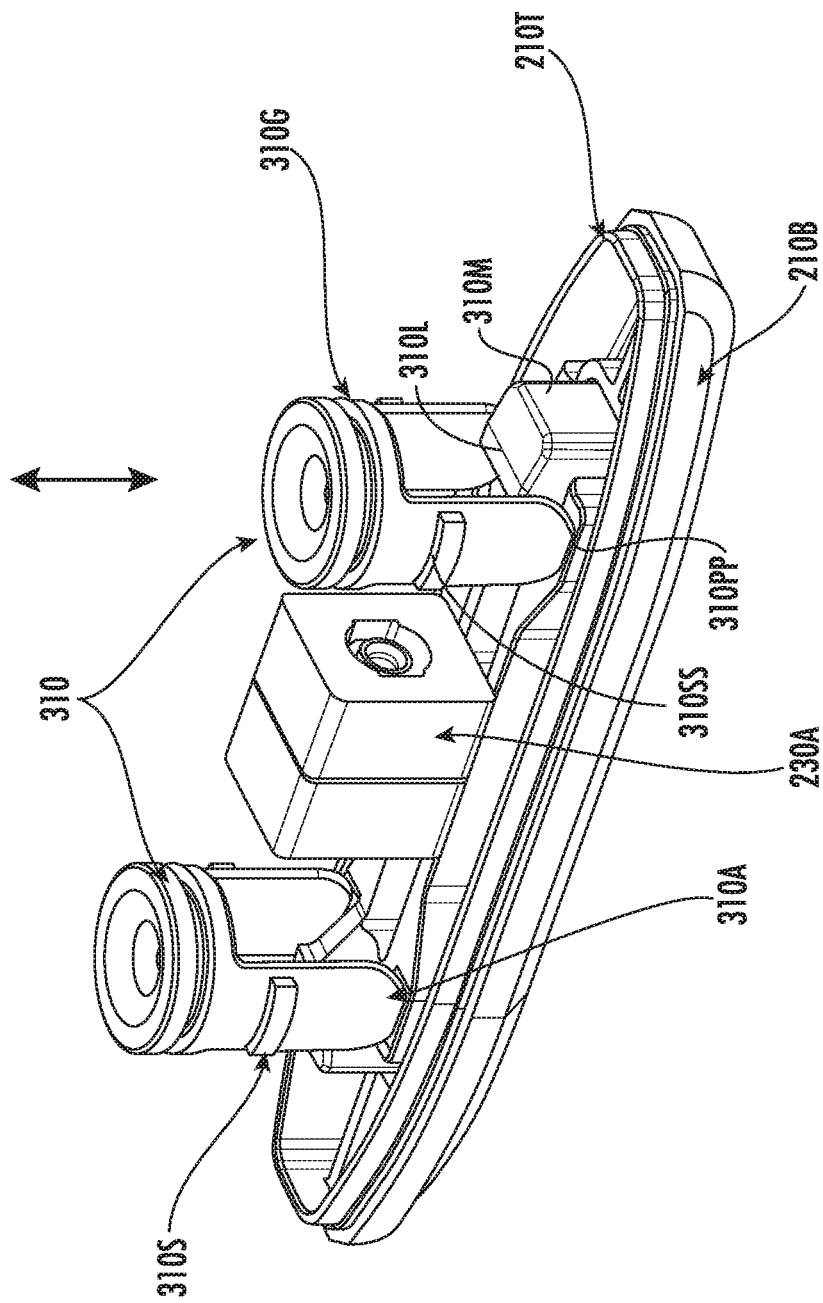
FIG. 16 is a top perspective assembly view of the fiber optic extender port of FIG. 13 with the top shell removed.

Actuator 310A cooperates with respective securing feature passageways 245 formed as a portion of the first portion 210A of shell 210 as discussed herein. Actuators 310A also comprise push arms 310PA. that are spaced apart for allowing a portion of the connector 10 to pass therethrough for mating as best shown in FIG. 16. When assembled, push arms 310PA contact portions of the securing member 310M adjacent to locking feature as shown and translating the actuator 310A downwards translates the locking feature 310L to a release position.

Like the extender port 200 of FIG. 1, securing features 310 may translate in a vertical direction as represented by the arrows in FIG. 16 for retaining and releasing connector 10 in extender port 200. As depicted, the resilient members 310R are disposed below the securing member 310M for biasing the ends of the securing member 310M (and the actuators 310A) upwards to a normally retained position (RP). Securing feature 310 further includes a locking feature 310L.

Figure 17:
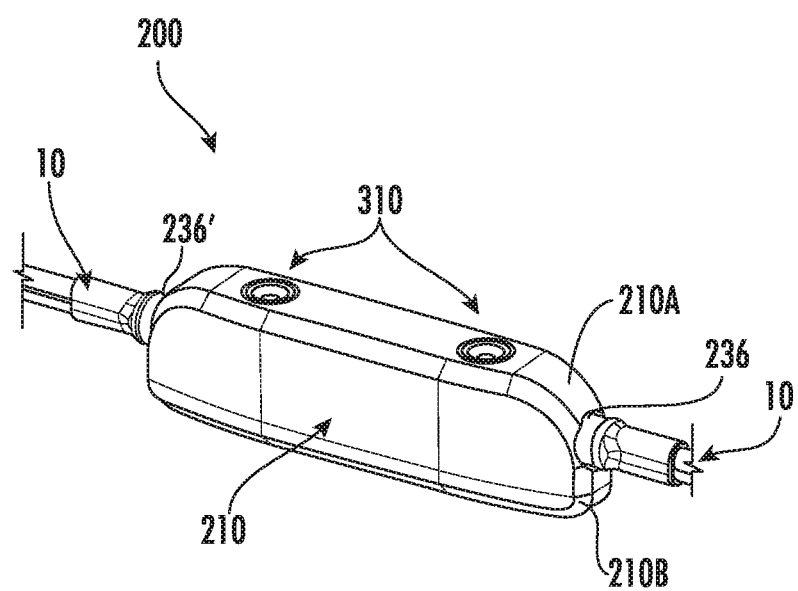
FIG. 17 is a perspective assembled view of the fiber optic extender port of FIG. 13 with fiber optic connectors inserted and secured in the respective connection ports and optically mated together.
Figure 18:
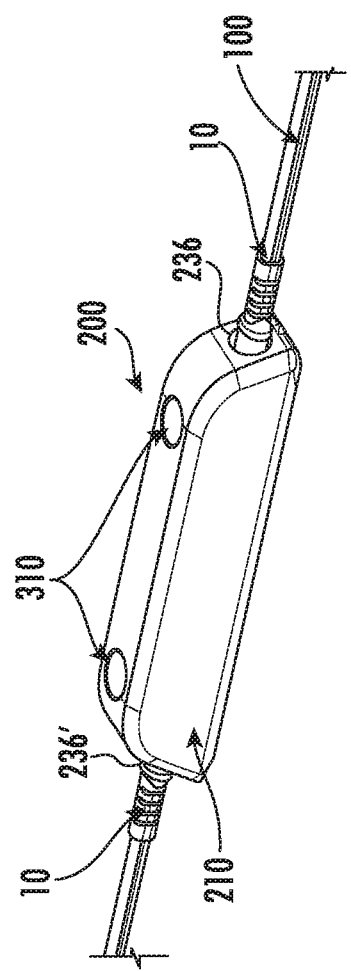
FIG. 18 is a perspective view of yet another explanatory fiber optic extender port according to the concepts disclosed for mating fiber optic connectors.

A simplified adapter assembly 230A is used in this embodiment that comprises a ferrule sleeve 230FS for precision alignment of mating ferrules between connectors 10 that is disposed within adapter housing 230H without a resilient member. FIG. 17 depicts the extender port 200 fully-assembled.

Devices may have other constructions for the securing features 310 that use more than one component. Illustratively, FIGS. 18-24 depict another extender port 200 that comprises a connection port 236 as a portion of the shell 210 with securing features 310 comprising more than one component. This extender port is similar to the construction described, and the description of this device with the securing feature 310 comprising more than one component will describe differences in the designs for the sake of brevity, and other features are similar to those disclosed.

Figure 29:
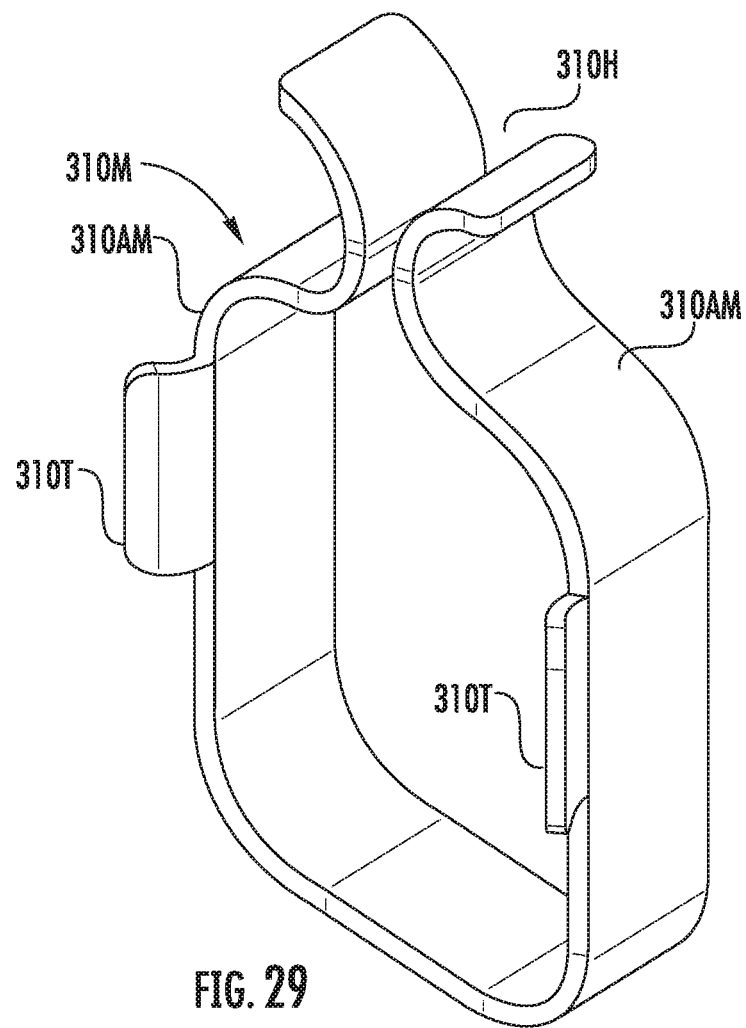
FIG. 29 is a perspective view showing the securing member formed from the securing member blank of FIG. 28 showing details of the same.

Extender port 200 of FIGS. 18-24 uses securing features 310 comprising an actuator 310A and a securing feature member 310M. Specifically, securing feature member 310M comprises an opening may be elastically deformed by actuator 310A (or other structure) when pushed (or upon insertion of a suitable connector 10 into connection port 236) and the securing feature member 310M springs back to engage a suitable portion of connector 10 such as locking feature 20L of connector housing 20 when the actuator 310A is released or when connector 10 is fully-seated within the connection port 236 as will discussed in more detail. As best shown in FIG. 29, the securing member 310M comprises a locking feature 310L formed by one or more arms 310AM.

FIGS. 19-22 are partial assembled views with portions of a securing feature sub-assembly 310SA removed as discussed below for disclosing the construction and operation of the securing feature 310. As depicted in FIG. 19, the securing member 310M may be placed into a housing formed by one or more housing portions 310HH for maintaining the proper orientation of the securing features within shell 210. The securing feature sub-assembly 310SA also allows for easier assembly of securing members 310M into the shell 210 of extender ports 200. In other words, the housing portions 310HH may have suitable geometry for keeping the securing members in the desired orientation. The right-side of FIG. 19 depicts the securing feature sub-assembly 310SA assembled and placed into the second portion 210B of shell 210. For instance, the second portion 210B may have a pocket or other alignment feature for seating the securing feature sub-assembly 310SA. The left-side of FIG. 19 depicts the securing member 310M and the actuator 310A without the housing portions 310HH to show the engagement with the locking features on the connector 10. Consequently, the actuators 310A are aligned and positioned with respective securing members 310M of the securing features.

Figure 20:
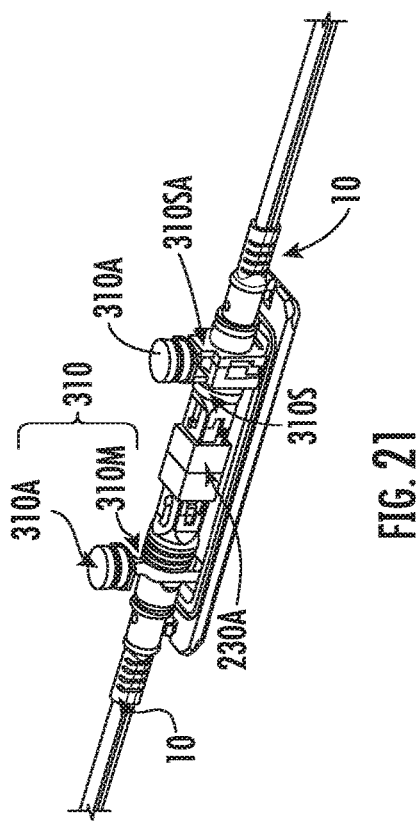
FIG. 20 is a perspective view of the securing feature installed in the fiber optic extender port of FIGS. 18 and 19 with a fiber optic connector attached with the adapter assembly and top shell removed for explanation purposes.
Figure 21:
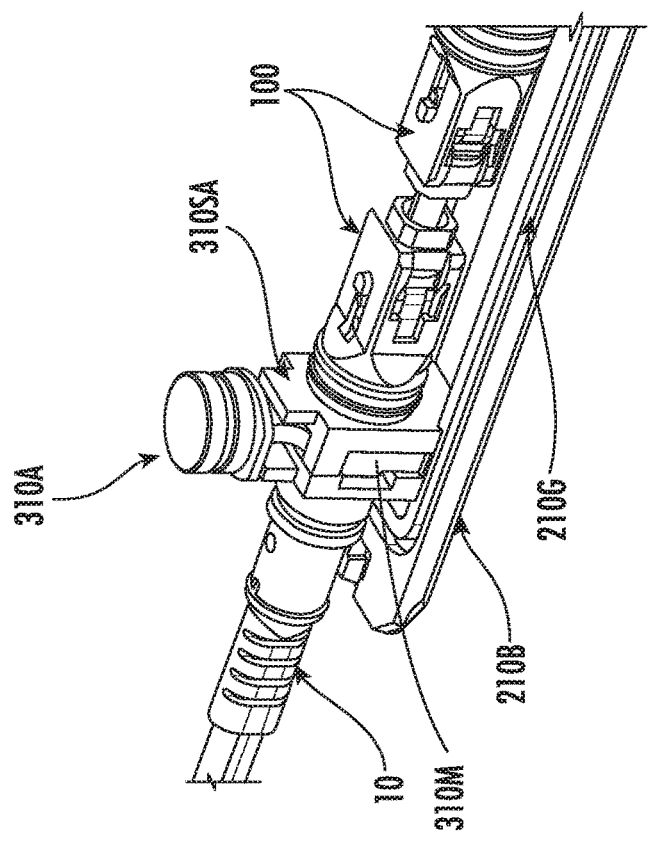
FIG. 21 is a perspective view of the fiber optic extender port of FIGS. 18 and 19 with housing portions removed from the securing feature on the left-side showing the securing member engaging the fiber optic connector.
Figure 22:
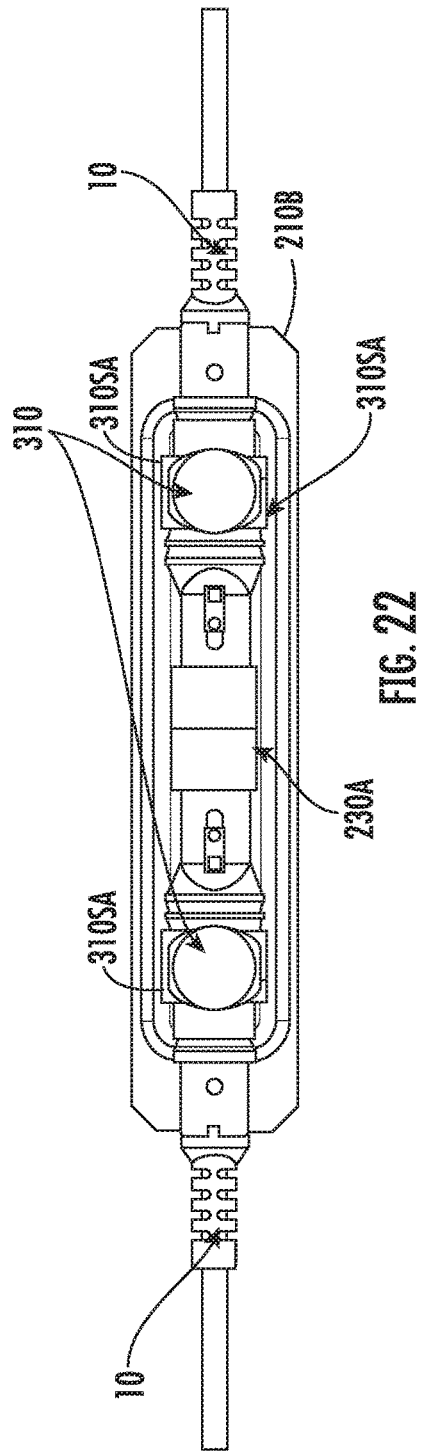
FIGS. 22 is a top view of fiber optic extender port of FIGS. 18 and 19 with the top shell removed and fiber optic connectors secured and mated within the adapter assembly.
Figure 23:
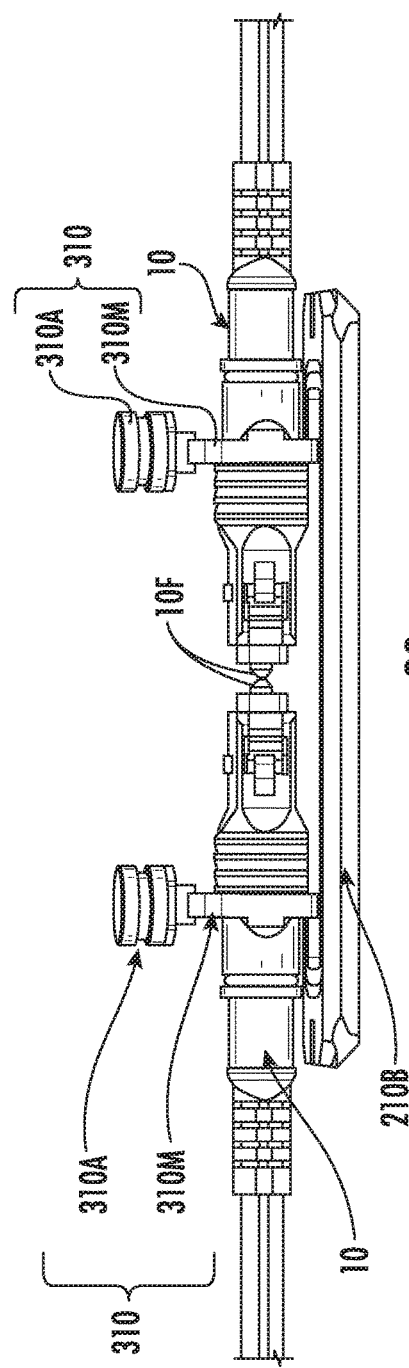
FIG. 23 is a side view of the fiber optic extender port of FIGS. 18 and 19 with housing portions removed from the securing features on both sides for showing the securing member engaging the fiber optic connector.
Figure 24:
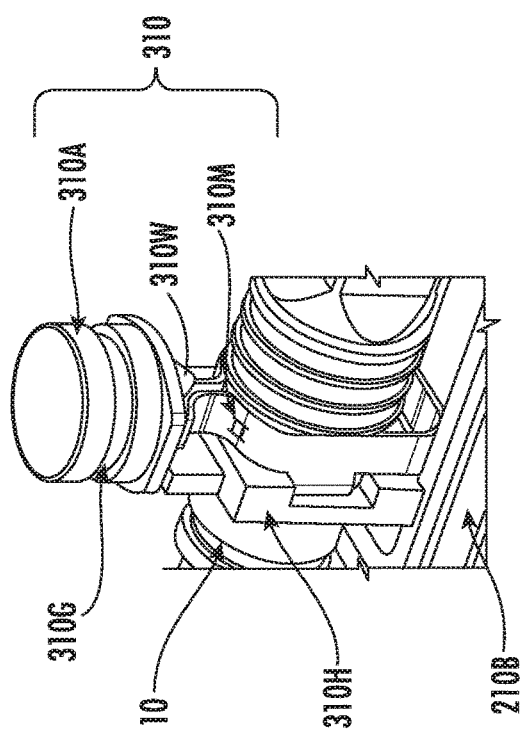
FIG. 24 is a detailed perspective view of the fiber optic extender port with one of the housing portions disposed about the securing feature and one housing portion removed for showing alignment of the housing and the securing member in the fiber optic extender port.

FIG. 20 is a detailed perspective view showing the securing member 310M disposed within the components 310H of 310SA and the adapter assembly 230A removed to show the mating of complimentary ferrules 10F of connectors 10. Specifically, the arms of the securing member 310M engage a locking feature 20L (e.g., a groove) that is integrally-formed on the housing 20 of the connector 10. FIG. 21 is a detailed perspective view similar to FIG. 20, but the adapter assembly 230A is shown.

Securing feature 310 comprises actuator 310A and securing member 310M. Securing member 310M comprises an opening between its arms 310AM that may be elastically deformed by actuator 310A when translated (i.e., pushed) or upon insertion of a suitable connector 10 into connection port 236 by spreading (i.e., translating) the arms of the securing member 310M outward. When the actuator 310A is released or the connector is fully-seated within the connection port 236 or input port 260, the arms 310AM of the securing member 310M springs back to engage a suitable portion of connector 10 such as locking feature 20L of connector housing 20 or move the actuator 310A to a normal position. The arms 310AM have an edge portion that act as a locking feature 310L for the suitable connector 10. By way of explanation, the edge portions of arms 310AM engage the locking feature 20L of the connector housing 20 for securing the connector 20. in order to release the connector 10 from the connection port 236, the arms 310AM and locking features 310L on the arms 310AM are translated outward.

Figures 26, 27:
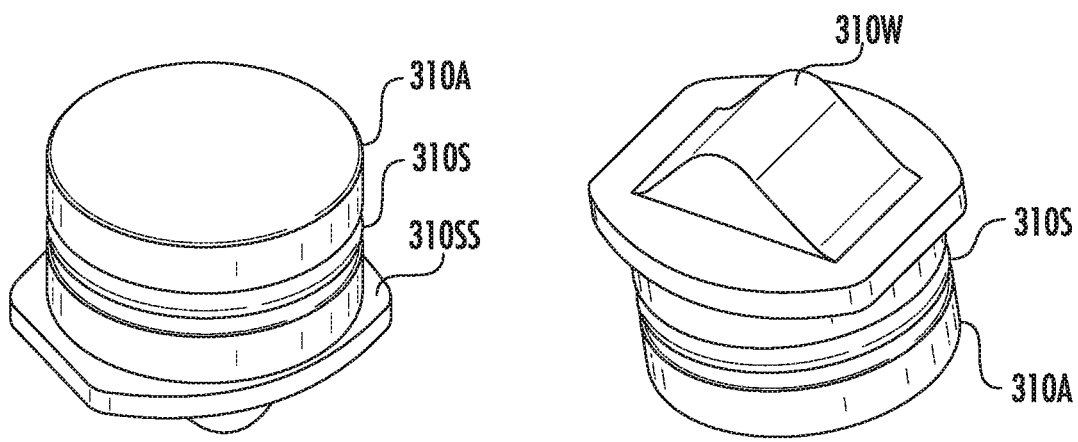

As best shown in FIG. 27, actuator 310A comprises a wedge 310W that pushes into a head end 310H of securing member 310M, thereby elastically deflecting the arms 310AM of securing member 310M outward for releasing connector 10. The securing member 310M or actuators 310A of securing feature 310 may comprise a variety of different constructions. Likewise, the securing features 310 comprising more than one component may be biased by a securing feature resilient member 310RM if desired. For instance, securing feature resilient member 310RM may bias the actuator 310A toward a secure position. In other embodiments, the securing feature resilient member may bias the securing member 310M.

Figure 25:
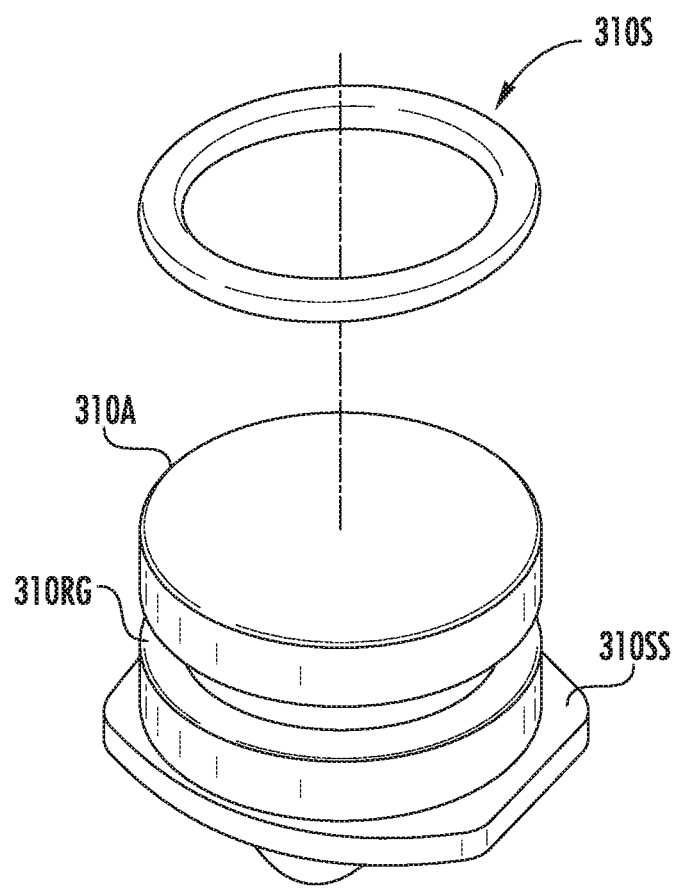
FIGS. 25-27 are various perspective views of the securing feature of the fiber optic extender port of FIG. 18.

FIGS. 25-27 are various perspective views of the actuator 310A of the securing feature 310 of the extender port 200 shown in FIGS. 18-24. Actuator 310A may include a sealing member 310S disposed above the connector port passageway 233 for keeping dirt, debris and the like out of portions of the extender port 200. Sealing member 310S is sized for the retention groove 310RG in the actuator 310A and the securing feature passageway 245 for sealing. Actuator 310A may also be shaped to have one or more guides 310G that cooperate with the shell 210 or connection port insert 230 for keeping proper rotational orientation of the wedge 310W within the respective securing feature passageway 245 during translation. In this embodiment, the shape of the flange aids in the rotational orientation. Actuator 310A may also comprise a stop surface 310SS for inhibiting over-travel or the actuator 310A from being removed from the extender port 200 when assembled. Actuator 310A may also be a different color or have a marking indicia for identifying the port type. For instance, the actuator 310A may be colored red for connection ports 236 and the actuator 310A for the input connection port 260 may be colored black. Other color or marking indicia schemes may be used for pass-through ports, multi-fiber ports or ports for split signals.

Thus, the securing feature member 310M of securing feature 310 is suitable for retaining connector 10 in connection port 236 as discussed herein. Various different embodiments are possible for securing features 310 comprising more than one component for the devices disclosed.

Figure 28:
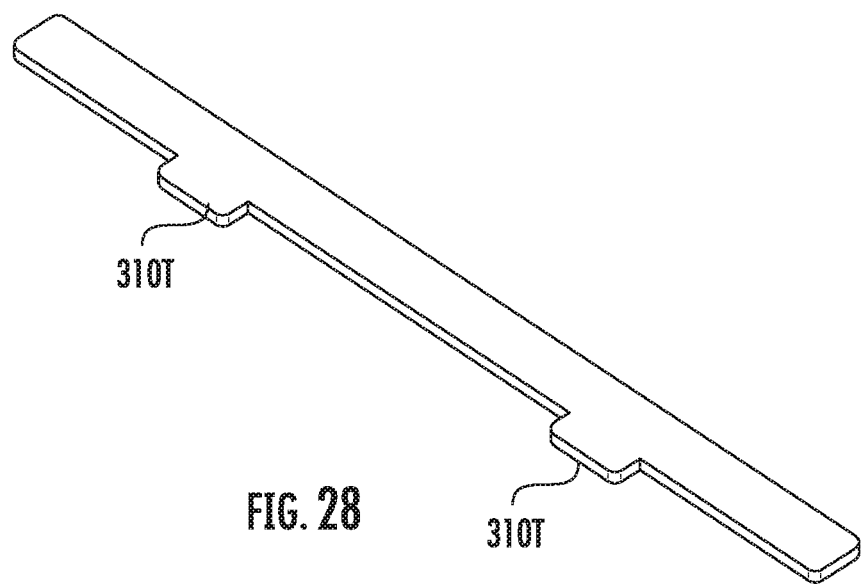
FIG. 28 is a perspective view of an explanatory securing member blank for forming the securing member of the securing feature for the fiber optic extender port of FIGS. 18-24.

FIGS. 25-29 are various views of securing member 310M for explaining details of the design. FIG. 28 is a perspective view of the securing member blank for forming the securing feature 310M depicted in FIG. 29. Securing member 310M may be formed from any suitable material such as a spring steel and have a suitable geometry for retaining a connector 10. As depicted, securing member 310M comprises arms 310AM that define an opening (not numbered) therebetween along with a head end 310H formed at the ends of the arms 310AM. The opening (not numbered) between the arms 310AM is sized for cooperating with a. suitable connector 10. Arms 310AM may comprise tabs 310T that are curved for aiding the engagement of the connector 10 with the securing member 310M upon insertion and allowing a smoother pushing and translation of the arms 310AM outward as connector 10 is inserted into connection port 236. Likewise, the head end 310H may also be formed with a suitable shape that cooperates with the actuator 310A. Like the other securing features 310, the securing feature 310 may comprises more than one component for translating from a retain position (RP) to an open position (OP) as a suitable connector 10 is inserted into the connection port 236. Once connector 10 is fully-Inserted into connector passageway 233, then the securing feature 310 automatically moves to the retain position (RP) since the arms 310AM are biased to the retain position. This advantageously allows a push and play connectivity of the connectors 10 with extender port 200 without having to turn a coupling nut or a bayonet like conventional devices. Thus, connections to the extender port may be made faster and in positions that may be awkward with relative ease.

Figure 30:
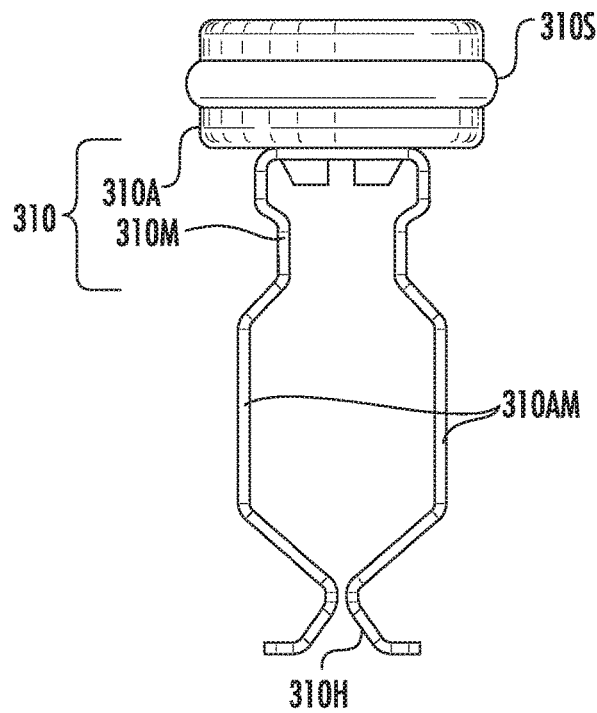
FIGS. 30 and 31 are views of another explanatory multi-component securing feature for use with fiber optic extender ports.
Figure 31:
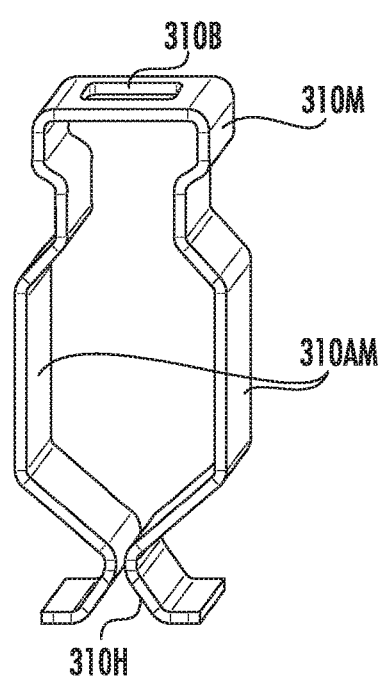

Securing features 310 comprising more than one component may have various other configurations for use with devices disclosed herein. FIGS. 30 and 31 depict perspective views of another securing feature 310 comprising securing member 310M for use with an actuator 310A. In this embodiment, the securing member 310M is inverted so that the head end 310H cooperates with a portion of the extender port shell for translating the arms 310AM outward compared with other embodiments. More specifically, a portion of the extender port such as connector port insert of shell comprises a wedge for translating the arms 310AM outward when the actuator 310A translates downward.

Figure 32:
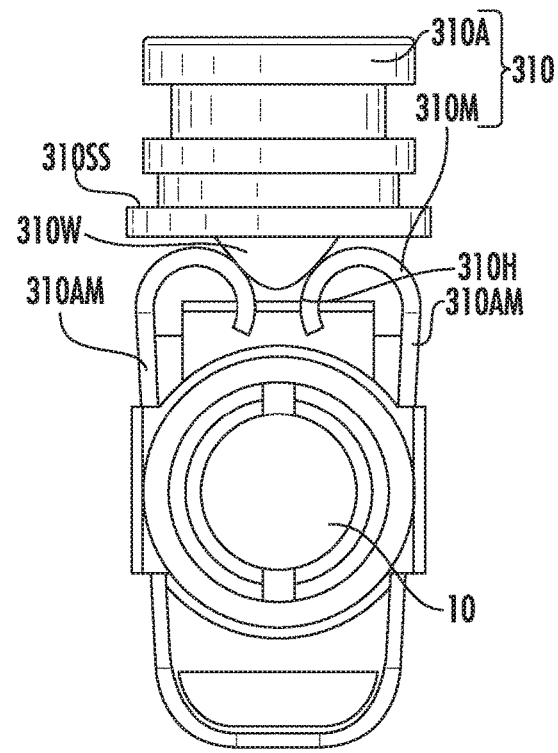
FIG. 32 is a front views of another explanatory multi-component securing feature for use with fiber optic extender ports.

FIG. 32 is a front view of still another securing feature 310 comprising securing member 310M for use with an actuator 310A that provides a reduced height compared with other embodiments. This securing member 310M comprises arms 310AM that define an opening (not numbered) therebetween along with a head end 310H formed at the ends of the arms 310AM. Head end 310H of this securing member 310M has the ends curled in and downward and the actuator 310A positions the wedge 310W further upward into the acutator 310A footprint as shown in FIG. 32 resulting in a construction that has a reduced height and allowing the device to reduce its height as well.

Still other variations of the concepts disclosed are possible. Securing features 310 may have any suitable orientation or construction for engaging connectors 10. Securing feature 310 may be arranged at an angle relative to the longitudinal axis LA of the connection port 236. By way of example, the securing feature 310 may comprises securing member 310M and actuator 310A disposed in a securing feature passageway 245 that is angled with respect to the longitudinal axis LA of the connection port 236. Likewise, connector 10 has a connector housing 20 with the locking feature 20L that is angled with respect to the longitudinal axis of the connector. Similar concepts may be used with as a portion of the shell or the connection port insert as well as a monolithic securing feature 310.

Figure 34:
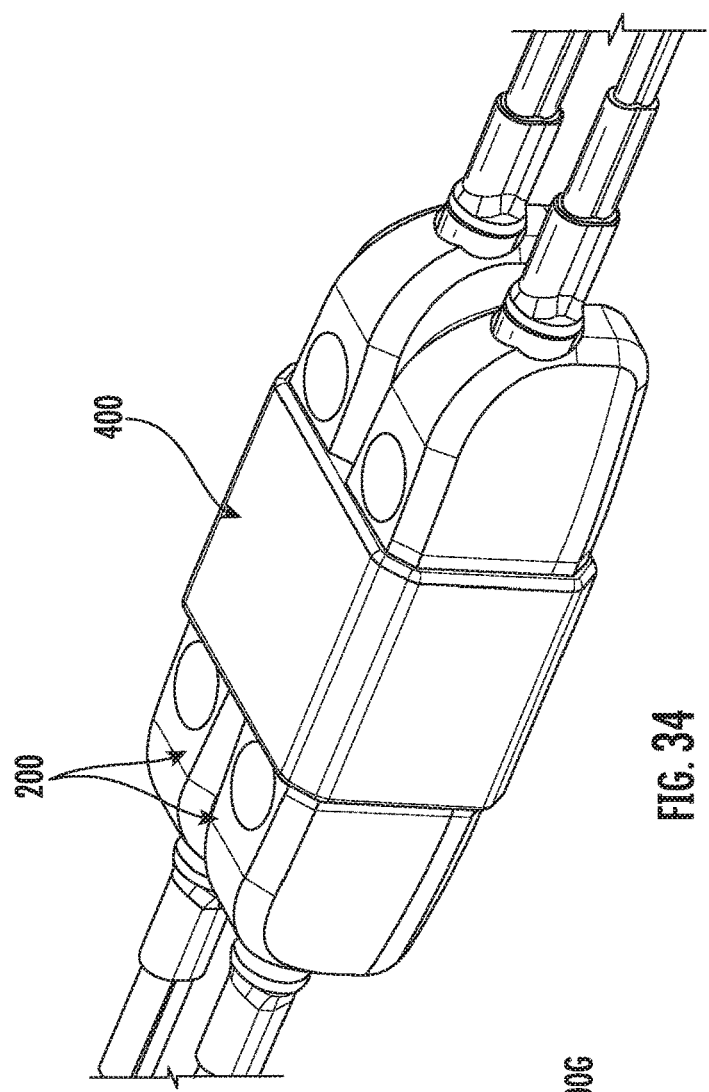
FIGS. 33 and 34 respectively depict perspective views of an organizer for holding a plurality of fiber optic extender ports in an array and the organizer with the fiber optic extender ports installed.
Figure 33:
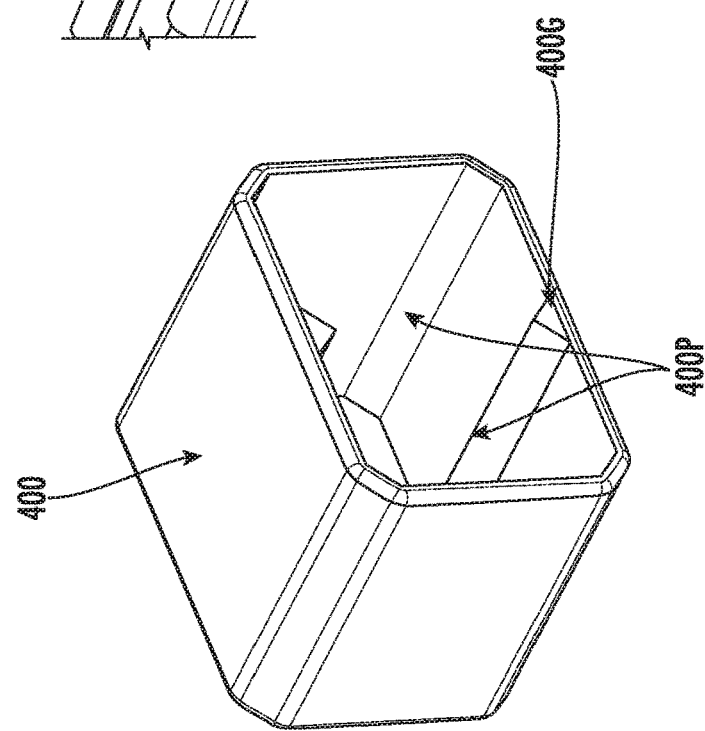

It may be advantageous to organize extender ports 200 in arrays. FIG. 33 depicts an organizer 400 comprising a passageway 400P and one or more guides 400G. Organizer 400 is sized for receiving a plurality of extender ports 200 for providing organization for an array of devices as shown in FIG. 34. Extender ports 200 are aligned with in the passageway 400P and have a friction fit with the organizer 400.

Figure 36:
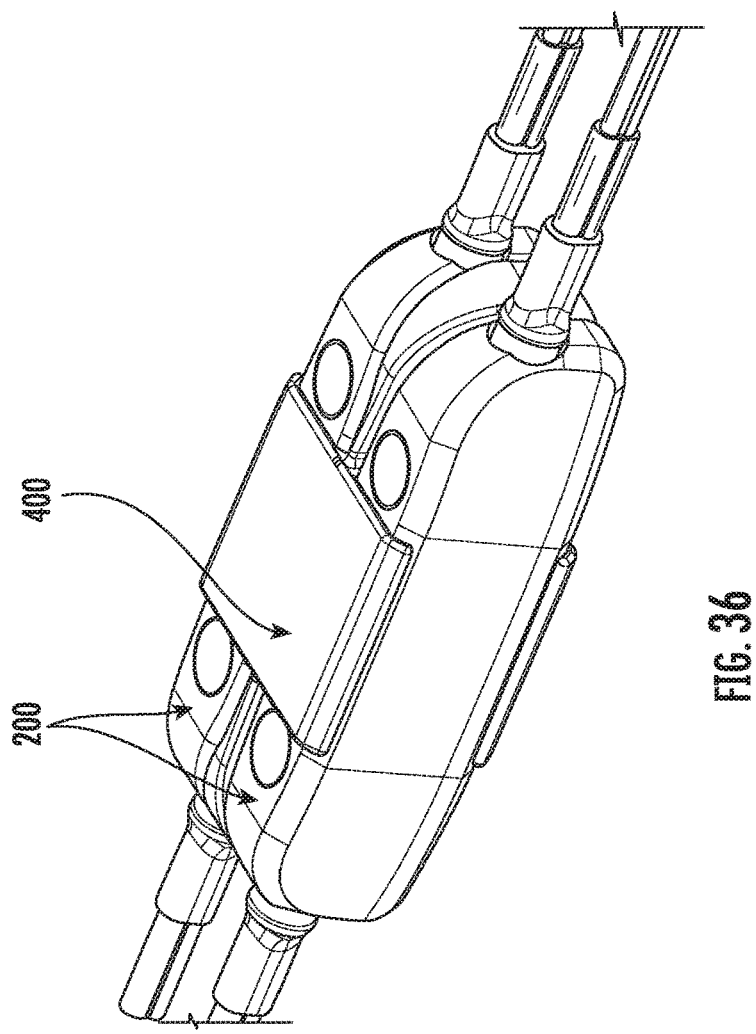
FIGS. 35 and 36 respectively depict perspective views of another organizer for holding a plurality of fiber optic extender ports in an array and the organizer with the fiber optic extender ports installed.
Figure 35:
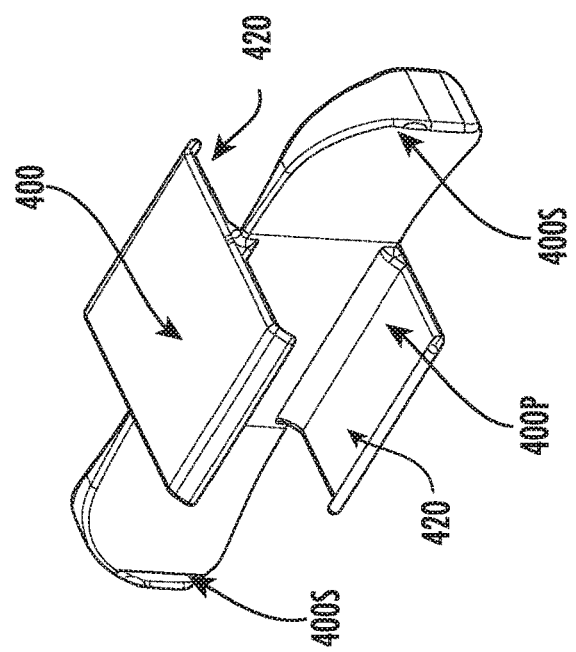

Organizers 400 can have a variety of shapes and configurations. FIG. 35 depicts another organizer 400 comprising segregated passageways 400P disposed on opposite sides of a common wall. The passageways 400P have an open side 420 and the ends of the common wall have snap-fit features 400S for securing extender ports 200 to the organizer 400 as shown in FIG. 36.

Figure 38:
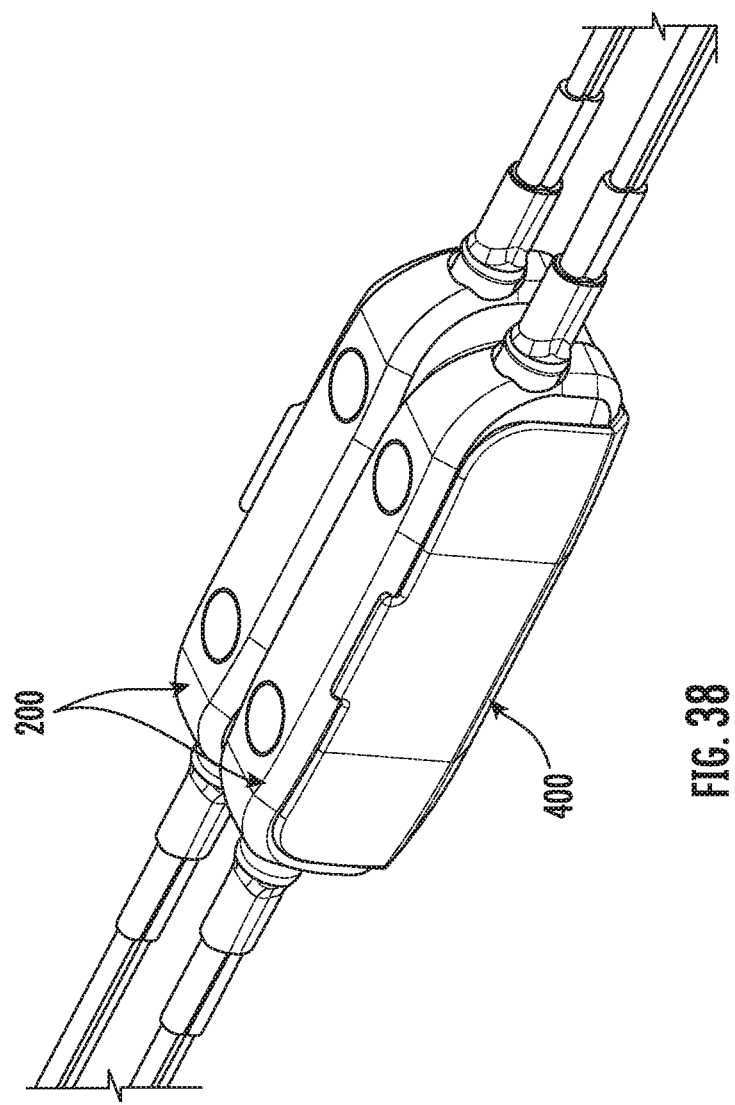
FIGS. 37 and 38 respectively depict perspective views of yet another organizer for holding a plurality of fiber optic extender ports in an array and the organizer with the fiber optic extender ports installed.
Figure 37:
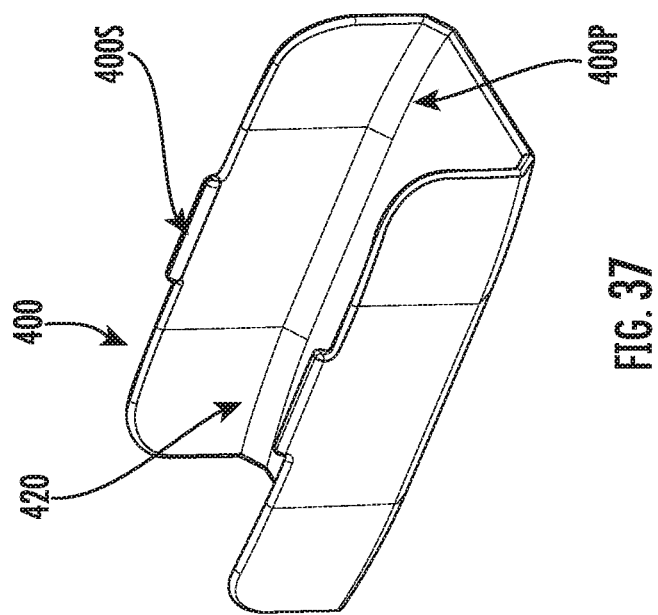

FIG. 37 depicts yet another organizer 400 comprising passageway 400P with open side 420. Organizer 400 comprises snap-fit features 400S for securing extender ports 200 to the organizer 400 as shown in FIG. 38.

The present application also discloses methods for making extender ports. One method of making an extender port comprises providing a shell 210 comprising a first connection port 236 having an optical connector opening 238 and a connection port passageway 233. The method includes assembling at least one securing feature so it is associated with a connection port passageway of the shell securing, and installing at least one securing feature resilient member for biasing a portion of the at least one securing feature. Other methods for making devices such as extender port 200 as disclosed herein are also contemplated.

Another method comprises providing a shell with a first connection port comprising an optical connector opening extending from an outer surface of the extender port into a cavity of the extender port and defining a first connection port passageway, and a second connection port comprising an optical connector opening extending from an outer surface of the extender port into a cavity of the extender port and defining a second connection port passageway, where the second connection port passageway is aligned with the first connection port passageway. The method includes assembling at least one securing feature so it is associated with a connection port passageway of the shell, and installing at least one securing feature resilient member for biasing a portion of the at least one securing feature.

The methods disclosed may further include steps or features as disclosed herein for making extender ports where the securing feature 310 may translate between an open position OP and a retain position RP. The method may include translating the securing feature 310 for moving the securing feature 310 to the open position OP and the securing feature 310 is biased to retain position RP.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An extender port for making optical connections, comprising:
   a shell comprising a first component and a second component that cooperate to define a cavity;
   a first connection port comprising an optical connector opening extending from an outer surface of the extender port into the cavity and defining a first connection port passageway;
   a second connection port comprising a second optical connector opening extending from an outer surface of the extender port into the cavity and defining a second port passageway, the second connection port passageway being aligned with the first connection port passageway; and
   at least one securing feature associated with the first connection port passageway, and the at least one securing feature comprises a ramp integrally formed at a portion of a bore with the ramp angling up when looking into the first connection port, wherein the bore is configured for receiving a suitable fiber optic connector therethrough, and a portion of the at least one securing feature is capable of translating within a portion of the shell.

2. The extender port of claim 1, wherein the securing feature comprises a locking member and an actuator.

3. The extender port of claim 1, wherein the bore is aligned with the at least one connection port passageway.

4. An extender port for making optical connections, comprising:
   a shell comprising a first component and a second component that cooperate to define a cavity;
   a first connection port comprising an optical connector opening extending from an outer surface of the extender port into a cavity and defining a first connection port passageway;
   a second connection port comprising an a second optical connector opening extending from an outer surface of the extender port into the cavity and defining a second connection port passageway, the second connection port passageway being aligned with the first connection port passageway;
at least one securing feature associated with the first connection port passageway, and the at least one securing feature comprises a retention groove and a ramp integrally formed at a portion of a bore with the ramp angling up when looking into the first connection port, wherein the bore is configured for receiving a suitable fiber optic connector therethrough, and the at least one securing feature is capable of translating within a portion of the shell, wherein the at least one securing feature translates from a retain position to an open position as a suitable fiber optic connector is inserted into the first connection port; and
a sealing member configured for being received in the retention groove of the at least one securing member.

5. The extender port of claim 4, wherein the bore further comprises a locking feature.

6. The extender port of claim 5, wherein the locking feature comprises a ledge.

7. The extender port of claim 4, further comprising at least one securing feature resilient member for biasing a portion of the at least one securing feature.

8. An extender port for making optical connections, comprising:
a shell comprising a first component and a second component that cooperate to define a cavity;
a first connection port comprising an optical connector opening extending from an outer surface of the extender port into a cavity and defining a first connection port passageway;
a second connection port comprising a second optical connector opening extending from an outer surface of the extender port into a cavity and defining a second connection port passageway, the second connection port passageway being aligned with the first connection port passageway;
at least one securing feature associated with the first connection port passageway, and the at least one securing feature comprises a retention groove and a ramp integrally formed at a portion of a bore with the ramp angling up when looking into the first connection port and a locking feature, and wherein the bore is configured for receiving a suitable fiber optic connector therethrough, and the at least one securing feature is capable of translating within a portion of shell, and wherein the at least one securing feature translates from a retain position to an open position as a suitable fiber optic connector is inserted into the first connection port; and
a sealing member configured for being received in the retention groove of the at least one securing member.

9. The extender port of claim 8, wherein the locking feature comprises a ledge.

10. The extender port of claim 8, wherein the locking feature comprises a retention surface.

11. An extender port for making optical connections, comprising:
a shell comprising a first component and a second component that cooperate to define a cavity and are weatherproofed with a sealed seam;
a first connection port comprising an optical connector opening extending from an outer surface of the extender port into a cavity and defining a first connection port passageway;
a second connection port comprising a second optical connector opening extending from an the outer surface of the extender port into the cavity and defining a second connection port passageway, the second connection port passageway being aligned with the first connection port passageway; and
at least one securing feature associated with the first connection port passageway, and the at least one securing feature comprises a ramp integrally formed at a portion of a bore with the ramp angling up when looking into the first connection port, a locking member, and an actuator, and the at least one securing feature is capable of translating within a portion of the shell, wherein the at least one securing feature translates from a retain position to an open position as a suitable fiber optic connector is inserted into the first connection port.

12. The extender port of claim 11, wherein the locking member is a portion of a securing feature sub-assembly.

13. The extender port of claim 11, wherein the first connection port is a portion of the shell.

14. The extender port of claim 11, further comprising at least one adapter aligned with the first connection port.

15. The extender port of claim 11, wherein the first connection port passageway comprising a keying portion.

16. The extender port of claim 11, further comprising a sealing feature disposed on the at least one securing feature.

17. The extender port of claim 11, wherein at least a portion of one securing feature passageway is arranged transversely to a longitudinal axis of the connector port passageway.

18. The extender port of claim 11, further comprising at least one adapter assembly aligned with the first connector port passageway.

19. The extender port of claim 18, wherein the adapter assembly is disposed in cavity of shell.

20. The extender port of claim 18, the adapter assembly further comprising a resilient member.

21. The extender port of claim 11, wherein the sealed seam further comprises a sealing element.

22. The extender port of claim 11, wherein the first connection port retains a suitable fiber optic connector when the fiber optic connector is fully-seated within the first connection port.

23. The extender port of claim 11, being disposed in an organizer suitable for holding a plurality of extender ports.

24. A method of making an extender port, comprising:
providing a shell comprising a first component and a second component defining a cavity, and the shell comprising a first connection port having an optical connector opening extending from an outer surface of the extender port into the cavity and defining a first connection port passageway and a second connection port comprising a second optical connector opening extending from the outer surface of the extender port into the cavity and defining a second connection port passageway with the second connection port passageway being aligned with the first connection port passageway;
assembling at least one securing feature so it is associated with the first connection port passageway of the shell, and the at least one securing feature comprises a retention groove and a ramp integrally formed at a portion of a bore with the ramp angling up when looking into the first connection port, wherein the bore is configured for receiving a suitable fiber optic connector therethrough, wherein a portion of the at least one securing feature is capable of translating within a portion of the shell, wherein a sealing member is received in the retention groove of the at least one securing member; and installing at least one securing feature resilient member for biasing a portion of the at least one securing feature.

25. A method of making an extender port, comprising:
providing a shell comprising a first component and a second component defining a cavity, and a first connection port comprising an optical connector opening extending from an outer surface of the extender port into the cavity of the extender port and defining a first connection port passageway, and a second connection port comprising a second optical connector opening extending from the outer surface of the extender port into the cavity of the extender port and defining a second connection port passageway, where the second connection port passageway is aligned with the first connection port passageway;
assembling at least one securing feature so it is associated with first connection port passageway of the shell, and the at least one securing feature comprises a ramp integrally formed at a portion of a bore with the ramp angling up when looking into the first connection port, wherein the bore is configured for receiving a suitable fiber optic connector therethrough, wherein a portion of the at least one securing feature is capable of translating within a portion of the shell; and
installing at least one securing feature resilient member for biasing a portion of the at least one securing feature.

26. The method of claim 25, wherein the at least one securing feature translates from a retain position to an open position as a suitable fiber optic connector is inserted into the first connection port.

27. The method of claim 25, wherein the at least one securing feature is capable of releasing a fiber optic connector when translating within a portion of the first securing feature passageway.

28. The method of claim 25, wherein the at least one securing feature is capable of moving to a retain position automatically when a suitable fiber optic connector is fully-inserted into the first connector port passageway.

29. The method of claim 25, wherein the at least one securing feature comprises a locking feature.

30. The method of claim 25, wherein the at least one securing feature comprises a locking feature, wherein the locking feature further comprises a ledge.

31. The method of claim 24, wherein the at least one securing feature translates from a retain position to an open position as a suitable fiber optic connector is inserted into the first connection port.

32. The method of claim 24, wherein the at least one securing feature comprises a locking feature, wherein the locking feature further comprises a ledge.

33. The extender port of claim 4, wherein the at least one securing feature comprises a locking member and an actuator.

34. The extender port of claim 8, wherein the at least one securing feature comprises a locking member and an actuator.

35. The extender port of claim 8, further comprising at least one securing feature resilient member for biasing a portion of the at least one securing feature.

* * * * *